United States Patent
Nishikawa et al.

(10) Patent No.: US 9,511,647 B2
(45) Date of Patent: Dec. 6, 2016

(54) AIR CONDITIONER FOR VEHICLE

(75) Inventors: Michio Nishikawa, Obu (JP);
Nobuharu Kakehashi, Toyoake (JP)

(73) Assignee: DENSO CORPORATION, Kariya, Aichi-pref. (JP)

(*) Notice: Subject to any disclaimer, the term of this patent is extended or adjusted under 35 U.S.C. 154(b) by 1449 days.

(21) Appl. No.: 12/807,312

(22) Filed: Sep. 1, 2010

(65) Prior Publication Data
US 2011/0048671 A1 Mar. 3, 2011

(30) Foreign Application Priority Data
Sep. 3, 2009 (JP) .................. 2009-203433
Jul. 16, 2010 (JP) .................. 2010-161416

(51) Int. Cl.
*B60H 1/00* (2006.01)
*B60H 1/32* (2006.01)

(52) U.S. Cl.
CPC ...... *B60H 1/00885* (2013.01); *B60H 1/00921* (2013.01); *B60H 1/3213* (2013.01)

(58) Field of Classification Search
CPC ........................................ B60H 1/00
USPC ............................................ 454/74
See application file for complete search history.

(56) References Cited

U.S. PATENT DOCUMENTS

| 4,523,517 | A * | 6/1985 | Cronin ............................ 454/74 |
| 4,961,404 | A * | 10/1990 | Itakura et al. .............. 123/41.31 |
| 7,246,496 | B2 * | 7/2007 | Goenka et al. .................. 62/3.3 |
| 2003/0182955 | A1 * | 10/2003 | Hirao ................ B60H 1/00392 62/202 |
| 2004/0011068 | A1 | 1/2004 | Hatakeyama |
| 2004/0060312 | A1 * | 4/2004 | Horn .................. B60H 1/00428 62/244 |
| 2005/0241818 | A1 * | 11/2005 | Yakumaru .............. B60H 1/004 165/202 |
| 2006/0032623 | A1 * | 2/2006 | Tsubone ............. B60H 1/00492 165/202 |

FOREIGN PATENT DOCUMENTS

| JP | 5-96931 | 4/1993 |
| JP | 2001-1749 | 1/2001 |
| JP | 2003-285619 | 10/2003 |
| JP | 2004-019590 | 1/2004 |
| WO | WO 2008/044435 | 4/2008 |

OTHER PUBLICATIONS

Office action dated Jul. 2, 2013 in corresponding Japanese Application No. 2010-161416.

* cited by examiner

*Primary Examiner* — Steven B McAllister
*Assistant Examiner* — Samantha Miller
(74) *Attorney, Agent, or Firm* — Harness, Dickey & Pierce, P.L.C.

(57) ABSTRACT

In an air conditioner for a vehicle with an equipment controlled in accordance with a traveling state of the vehicle, a first heater is disposed to heat air to be blown into a vehicle compartment by using a coolant of the equipment as a heat source, and a second heater is adapted as an auxiliary heater to further heat the air heated by the first heater. A heating capacity of the first heater is controlled such that a temperature of the equipment is approached to a predetermined temperature when the thermal fluid after passing through the first heater returns the equipment, and a heating capacity of the second heater is controlled such that a temperature of air to be blown into the vehicle compartment becomes a desired temperature.

25 Claims, 13 Drawing Sheets

AIR CONDITIONER FOR VEHICLE

CROSS REFERENCE TO RELATED APPLICATION

This application is based on Japanese Patent Applications No. 2009-203433 filed on Sep. 3, 2009, and No. 2010-161416 filed on Jul. 16, 2010, the contents of which are incorporated herein by reference in its entirety.

FIELD OF THE INVENTION

The present invention relates to an air conditioner for a vehicle, which can perform a heating of a vehicle compartment by using an exhaust heat of an equipment mounted to the vehicle, operated in accordance with a traveling state of the vehicle.

BACKGROUND OF THE INVENTION

Conventionally, Patent Document 1 (JP-2001-1749A corresponding to US 2003/0182955A1) describes regarding a vehicle air conditioner, which performs a heating of a vehicle compartment by heating air to be blown into the vehicle compartment by using both an interior heat exchanger of a heat pump cycle and a heater core. Here, the interior heat exchanger is operated as a condenser for cooling and condensing refrigerant in the heat pump cycle, and the heat core is a heating heat exchanger for heating air by using engine coolant as its heat source.

Furthermore, in the vehicle air conditioner of the Patent Document 1, the interior heat exchanger is located upstream of the heater core in a flow direction of air so that air having been heated by the interior heat exchanger is re-heated in the heater core. Furthermore, a flow amount of the engine coolant supplied to the heater core is adjusted by a flow adjustment valve, and thereby the temperature of air to be blown into the vehicle compartment can be adjusted.

In the vehicle air conditioner of the Patent Document 1, when the air flowing from the interior heat exchanger is re-heated in the heater core by using exhaust heat from a vehicle engine as its heating source, a using degree of the exhaust heat of the engine is changed so that the temperature of air to be blown into the vehicle compartment is adjusted, thereby performing a suitable heating.

In the vehicle air conditioner of the Patent Document 1, it is necessary to make the temperature of engine coolant higher than the temperature of air heated by the interior heat exchanger, in order to suitably perform the heating of the vehicle compartment. Thus, when the air conditioner of the patent Document 1 is used for a hybrid vehicle driven by an engine and an electrical motor for traveling, it is difficult to suitably perform the heating of the vehicle compartment by using the exhaust heat of the engine in accordance with a vehicle traveling state.

In the hybrid vehicle, the vehicle is sometime traveled by only using a driving force of the electrical motor for traveling so as to improve fuel consumption of the engine while the engine is in a stop state. In this state, it is impossible to sufficiently obtain exhaust heat from the engine. As a result, the temperature of the engine coolant may be lower than the temperature of air flowing from the interior heat exchanger, and it is difficult to suitably perform the heating of the vehicle compartment.

To overcome the above problem, the engine may be operated so that a necessary exhaust heat required for the suitable heating can be obtained, when the heating of the vehicle compartment is performed in a hybrid vehicle. However, in this case, fuel consumption is remarkably deteriorated in the hybrid vehicle.

This problem is also caused when the air conditioner of the Patent Document 1 is used for a fuel cell vehicle, in which an electrical power is supplied to an electrical motor for traveling from a fuel cell, and a cell coolant is used as a heat source of the heater core. In the fuel cell vehicle, the temperature of the fuel cell itself is maintained to a predetermined temperature in order to improve power generation efficiency of the fuel cell, by controlling a flow amount of cell coolant in accordance with a vehicle traveling state.

Thus, if the temperature of the cell coolant is set lower than the temperature of air heated by the interior heat exchanger, it will be difficult to suitably perform the heating in the vehicle compartment. On the other hand, if the temperature of the cell coolant is increased in order to realize the suitable heating of the vehicle compartment, the power generation efficiency of the fuel cell will be decreased, thereby deteriorating the fuel consumption in the fuel cell vehicle.

SUMMARY OF THE INVENTION

In view of the foregoing problems, it is an object of the present invention to provide an air conditioner for a vehicle, which can suitably perform heating of a vehicle compartment while restricting deterioration of a fuel consumption of the vehicle, even when exhaust heat of a vehicle equipment used as a heating source in a heating of the vehicle compartment is insufficient for suitably performing the heating.

According to an aspect of the present invention, an air conditioner for a vehicle with an equipment that is mounted to the vehicle and is controlled in accordance with a traveling state of the vehicle, includes: a first heater disposed in a thermal fluid circulation circuit in which a thermal fluid heated by exhaust heat of the equipment circulates, and configured to heat air to be blown into a vehicle compartment by using the thermal fluid as a heat source; a second heater adapted as an auxiliary heater to further heat the air heated by the first heater; a first heating capacity control means for controlling a heating capacity of the first heater; and a second heating capacity control means for controlling a heating capacity of the second heater. The first heating capacity control means controls the heating capacity of the first heater such that a temperature of the equipment is approached to a predetermined temperature when the thermal fluid after passing through the first heater returns the equipment, and the second heating capacity control means controls the heating capacity of the second heater such that temperature of air to be blown into the vehicle compartment becomes a desired temperature.

Thus, even when the temperature of the thermal fluid is insufficient for suitably performing the heating of the vehicle compartment, the temperature of air to be blown into the vehicle compartment can be increased by using the heating capacity of the second heater, thereby suitably performing the heating of the vehicle compartment. Furthermore, it can prevent the temperature of the vehicle equipment itself from being excessively lower than the predetermined temperature T1.

Accordingly, even when the exhaust heat of the vehicle equipment is insufficient for performing the heating of the vehicle compartment, it can prevent the vehicle equipment from being unnecessary operated due to the heating of the vehicle compartment, thereby preventing the fuel consumption from being deteriorated. As a result, it is possible to suitably perform heating of the vehicle compartment while restricting deterioration of the fuel consumption of the vehicle, even when exhaust heat of the vehicle equipment used as the heating source in the heating of the vehicle compartment is insufficient for suitably performing the heating.

According to another aspect of the present invention, an air conditioner for a vehicle with an equipment that is mounted to the vehicle and is controlled in accordance with a traveling state of the vehicle, includes: a first heater disposed in a thermal fluid circulation circuit in which a thermal fluid heated by exhaust heat of the equipment circulates, and configured to heat air to be blown into a vehicle compartment by using the thermal fluid as a heat source; a second heater adapted as an auxiliary heater to further heat the air heated by the first heater; a first heating capacity control means for controlling a heating capacity of the first heater; and a second heating capacity control means for controlling a heating capacity of the second heater. Furthermore, the first heating capacity control means controls the heating capacity of the first heater such that a temperature of the equipment becomes equal to or higher than a predetermined temperature when the thermal fluid after passing through the first heater returns the equipment, and the second heating capacity control means controls the heating capacity of the second heater such that temperature of air to be blown into the vehicle compartment becomes a desired temperature.

Thus, even when the temperature of the thermal fluid is insufficient to perform the heating of the vehicle compartment, the temperature of air to be blown into the vehicle compartment can be sufficiently increased to the desired temperature by using the heating capacity of the second heater. Therefore, the heating of the vehicle compartment can be suitably performed.

Furthermore, even when the exhaust heat of the vehicle equipment is insufficient for performing the heating of the vehicle compartment, it can prevent the vehicle equipment from being unnecessary operated due to the heating of the vehicle compartment, thereby preventing the fuel consumption from being deteriorated. As a result, it is possible to suitably perform heating of the vehicle compartment while restricting deterioration of a fuel consumption of the vehicle, even when exhaust heat of a vehicle equipment used as a heating source in the heating of the vehicle compartment is insufficient for suitably performing the heating.

In the air conditioner according to any one of the first and second aspects of the present invention, the temperature of the vehicle equipment may be a temperature of the vehicle equipment itself such as an inside temperature or an outer surface temperature of the vehicle equipment, or may be a temperature having a relation with the temperature of the vehicle equipment itself. For example, a temperature of the thermal fluid may be used as the temperature of the equipment.

In the air conditioner according to any one of the first and second aspects of the present invention, a heating capacity changing portion may be provided to change the heating capacity of the first heater. In this case, the first heating capacity control means controls operation of the heating capacity changing portion, so as to control the heating capacity of the first heater.

Furthermore, the first heater may be a heating heat exchanger configured to perform heat exchange between the thermal fluid flowing therein and air passing therethrough. In this case, the heating capacity changing portion changes a flow amount of the thermal fluid flowing through the heating heat exchanger, so as to change the heating capacity of the first heater. The heating capacity changing portion may be a flow adjustment valve that adjusts the flow amount of the thermal fluid flowing through the heating heat exchanger.

Alternatively, the heating capacity changing portion may be configured by a bypass passage through which the thermal fluid flows while bypassing the heating heat exchanger, and an adjustment valve adjusting an open degree of the bypass passage. Furthermore, the first heating capacity control means may increase the flow amount of the thermal fluid flowing through the heating heat exchanger in accordance with an increase of the temperature of the thermal fluid before being heat exchanged with the air in the heating heat exchanger.

Alternatively, the first heater may be a heating heat exchanger configured to perform heat exchange between the thermal fluid flowing therein and air passing therethrough, and the heating capacity changing portion may change a flow amount of air passing through the heating heat exchanger so as to change the heating capacity of the first heater. For example, the heating capacity changing portion may change a ratio between the flow amount of air passing through the heating heat exchanger and a flow amount of air bypassing the heating heat exchanger, so as to change the flow amount of air passing through the heating heat exchanger.

In the air conditioner according to any one of the first and second aspects of the present invention, the thermal fluid may be a coolant for cooling the equipment mounted to the vehicle. Furthermore, the predetermined temperature may be set to be equal to or higher than a necessary temperature required for a heating control of the equipment mounted to the vehicle.

In the air conditioner according to any one of the first and second aspects of the present invention, when a vehicle speed is lower than a predetermined speed, the first heating capacity control means may control the heating capacity of the first heater so as to increase the temperature of the equipment, as compared with a case where the vehicle speed is not lower than the predetermined speed.

The second heater may be a refrigerant radiator in which a refrigerant discharged from a compressor of a refrigerant cycle radiates heat to air, and the second heating capacity control means may control a discharge capacity of the compressor so as to control the heating capacity of the refrigerant radiator. In this case, the compressor may be an electrical compressor that is operated when being supplied with electrical power.

In the air conditioner according to any one of the first and second aspects of the present invention, the second heating capacity control means may increase the heating capacity of the second heater before the first heating capacity control means reduces the heating capacity of the first heater.

Furthermore, the equipment mounted to the vehicle may be an internal combustion engine that outputs a drive force for traveling the vehicle, or may be a fuel cell which outputs an electrical power to a motor for traveling the vehicle.

In addition, the first heating capacity control means may control the heating capacity of the first heater such that the temperature of the equipment is approached to the predetermined temperature within a temperature range equal to or higher than the predetermined temperature. Alternatively, the first heating capacity control means may control the heating capacity of the first heater such that the temperature of the equipment is approached to the predetermined temperature within a temperature range equal to or lower than the predetermined temperature.

BRIEF DESCRIPTION OF THE DRAWINGS

Other objects, features and advantages of the present invention will become more apparent from the following description made with reference to the accompanying drawings, in which like parts are designated by like reference numbers and in which.

DETAILED DESCRIPTION OF EMBODIMENTS

Figure 1:
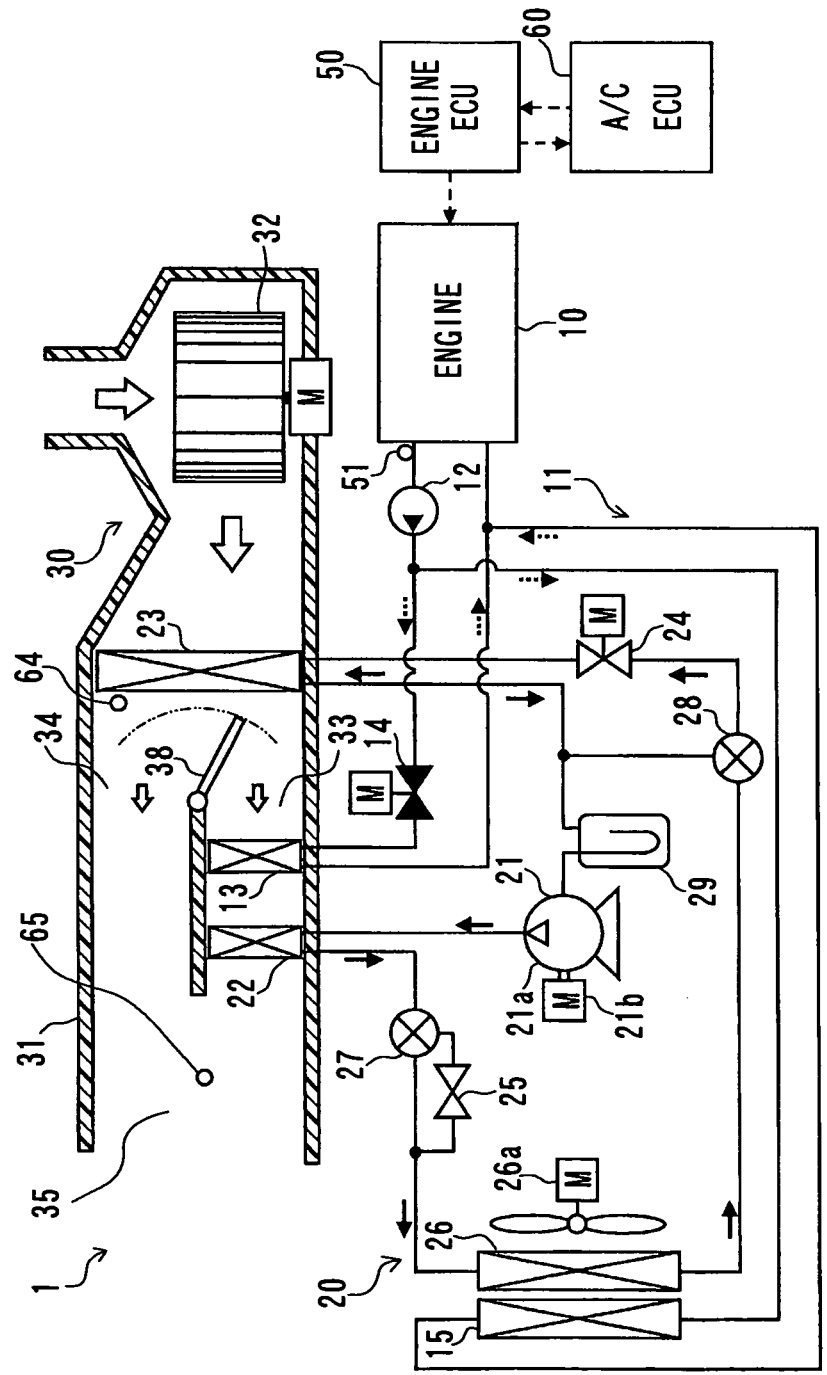
FIG. 1 is a schematic diagram showing an air conditioner for a vehicle according to a first embodiment of the invention.

Embodiments for carrying out the present invention will be described hereafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

A first embodiment of the invention will be described below with reference to FIGS. 1 to 8. FIG. 1 is a schematic diagram showing an air conditioner 1 for a vehicle according to a first embodiment of the invention. In the present embodiment, the air conditioner 1 is typically used for a hybrid vehicle which is traveled by a vehicle driving force composed of an internal combustion engine 10 and an electrical motor for a vehicle traveling.

In the hybrid vehicle of the embodiment, the engine 10 is operated or stopped in accordance with a traveling load of the vehicle. Thus, the hybrid vehicle can be switched to a traveling state in which the vehicle is traveled by using driving force from both of the engine 10 and the electrical motor for traveling, or a traveling state (i.e., EV traveling state) in which the vehicle is traveled only by using the electrical motor for traveling while the engine is stopped. Thus, in the hybrid vehicle, fuel consumption can be improved as compared with a vehicle driven only by the engine 10.

Thus, the engine 10 of the present embodiment is one example of the equipment mounted to the vehicle, which is controlled in accordance with the traveling state of the vehicle. Specifically, the operation of the engine 10 is controlled by a control signal output from an engine controller 50 (i.e., engine ECU). When the engine 10 is operated, heat is generated from the engine 10. Therefore, a coolant circuit 11, in which an engine coolant is circulated, is connected to the engine 10, so that the engine 10 is cooled and temperature of the engine 10 is controlled.

In the coolant circuit 11, a coolant pump 12, a heater core 13, a flow adjustment valve 14 and a radiator 15 and the like are arranged. The coolant pump 12 is an electrical water pump, in which a rotational speed thereof is controlled by a control signal output from the engine controller 50 so that a circulation amount of the engine coolant is controlled. In FIG. 1, the chain line arrows indicate the flow direction of engine coolant in the coolant circuit 11.

The heater core 13 is disposed in an air passage of an interior air conditioning unit 30 of a vehicle air conditioner 1, so that air to be blown into the vehicle compartment is heated. That is, the heater core 13 is a heating heat exchanger for heating air to be blown into the vehicle compartment by performing heat exchange between the engine coolant and air, in a heating mode or a dehumidifying and heating mode. The air passage is defined in the interior air conditioning unit 30 so that air flows into the vehicle compartment via the air passage. In the present embodiment, the heater core 13 is a heating unit for heating air by using engine coolant as a heat source. The engine coolant is a thermal fluid heated by exhaust heat of the engine 10.

The flow adjustment valve 14 is a heating capacity changing unit that is configured to change a heating capacity (i.e., air heating capacity) of the heater core 13 by changing the flow amount of the engine coolant flowing through the heater core 13. For example, the flow adjustment valve 14 is configured to have a valve body with a changeable open degree, and an electrical actuator for controlling the open degree of the valve body. Furthermore, the operation of the flow adjustment valve 14 is controlled by a control signal output from air conditioning controller 60.

The radiator 15 is a heat exchanger which cools engine coolant by exchanging heat between the engine coolant and outside air (i.e., air outside of the vehicle compartment). Thus, the radiator 15 can be used to radiate the exhaust heat of the engine 10 to the atmosphere via the engine coolant. The engine coolant absorbs heat while passing through the engine 10, and radiates heat to the atmosphere while passing through the radiator 15. In the coolant circuit 11 of the present embodiment, the heater core 13 and the radiator 15 are arranged in parallel with respect to the flow of the engine coolant.

The coolant circuit 11 may be provided with a bypass passage (not shown) through which the engine coolant flows while bypassing the radiator 15. In this case, a thermostat valve (not shown) is disposed in the coolant circuit 11 to cause the engine coolant to flow into the bypass circuit when a temperature of the engine coolant is lower than a predetermined value (e.g., 90° C., in the present embodiment). Thus, it can restrict a generation of fluctuation in the engine operation due to a viscosity increase of an engine oil, or a generation of an operation error of a catalyst for purifying exhaust gas due to a temperature decrease of the exhaust gas, even when the temperature of the engine 10 itself is decreased.

As described above, in the hybrid vehicle of the present embodiment, the engine 10 may be stopped in accordance with a traveling load of the vehicle. Thus, even in the vehicle traveling state, the temperature of the engine 10 may be decreased. Accordingly, in the present embodiment, the engine controller 50 performs a heating control of the engine 10, in which the engine 10 is operated regardless of the vehicle traveling state, when the temperature of the engine coolant is lower than a predetermined temperature, as described later.

Next, the configuration of the air conditioner 1 according to the present embodiment will be described. The air conditioner 1 is provided with a vapor-compression refrigerant cycle device 20 that is configured to switch a refrigerant circuit between a cooling mode for cooling the vehicle compartment, a heating mode for heating the vehicle compartment, and a dehumidifying and heating mode for dehumidifying and heating the vehicle compartment. In the refrigerant cycle device 20 of FIG. 1, the solid arrows indicate the flow direction of the refrigerant in the cooling mode.

The refrigerant cycle device 20 includes a compressor 21, an interior condenser 22 (i.e., interior heat exchanger), an interior evaporator 23 (i.e., interior heat exchanger), an electrical expansion valve 24, a fixed throttle 25, an exterior heat exchanger 26, and first and second electrical switching valves 27, 28, and the like. The compressor 21 is configured to compress the refrigerant. The interior condenser 22 and the interior evaporator 23 are located as an interior heat exchanger, in the air passage of the interior air conditioning unit 30 to perform heat exchange between the refrigerant and air to be blown into the vehicle compartment. The electrical expansion valve 24 and the fixed throttle 25 are disposed as a decompression unit to decompress and expand the refrigerant. The exterior heat exchanger 26 is disposed to perform heat exchange between the refrigerant and outside air. A plurality of refrigerant circuit switching units can be disposed in the refrigerant cycle device 20 to switch the refrigerant circuit. In the present embodiments, two refrigerant circuit switching units (i.e., the electrical switching valves 27, 28) are typically located in the refrigerant cycle device 20.

For example, in the refrigerant cycle device 20, a Freon-type refrigerant may be used. In this case, a sub-critical refrigerant cycle is configured in the refrigerant cycle device 20. In the sub-critical refrigerant cycle, a refrigerant pressure on a high-pressure side discharged from the compressor 21 and before being decompressed becomes lower than the critical pressure of the refrigerant.

The compressor 21 is disposed in an engine compartment to draw the refrigerant, to compress the drawn refrigerant and to discharge the compressed refrigerant. For example, the compressor 21 is an electrical compressor in which a fixed-displacement compression mechanism 21a with a fixed discharge capacity is driven by an electrical motor 21b. As the fixed-displacement compression mechanism 21a, various compression mechanisms such as a scroll-type compression mechanism, a vane-type compression mechanism or the like may be used.

Figure 2:
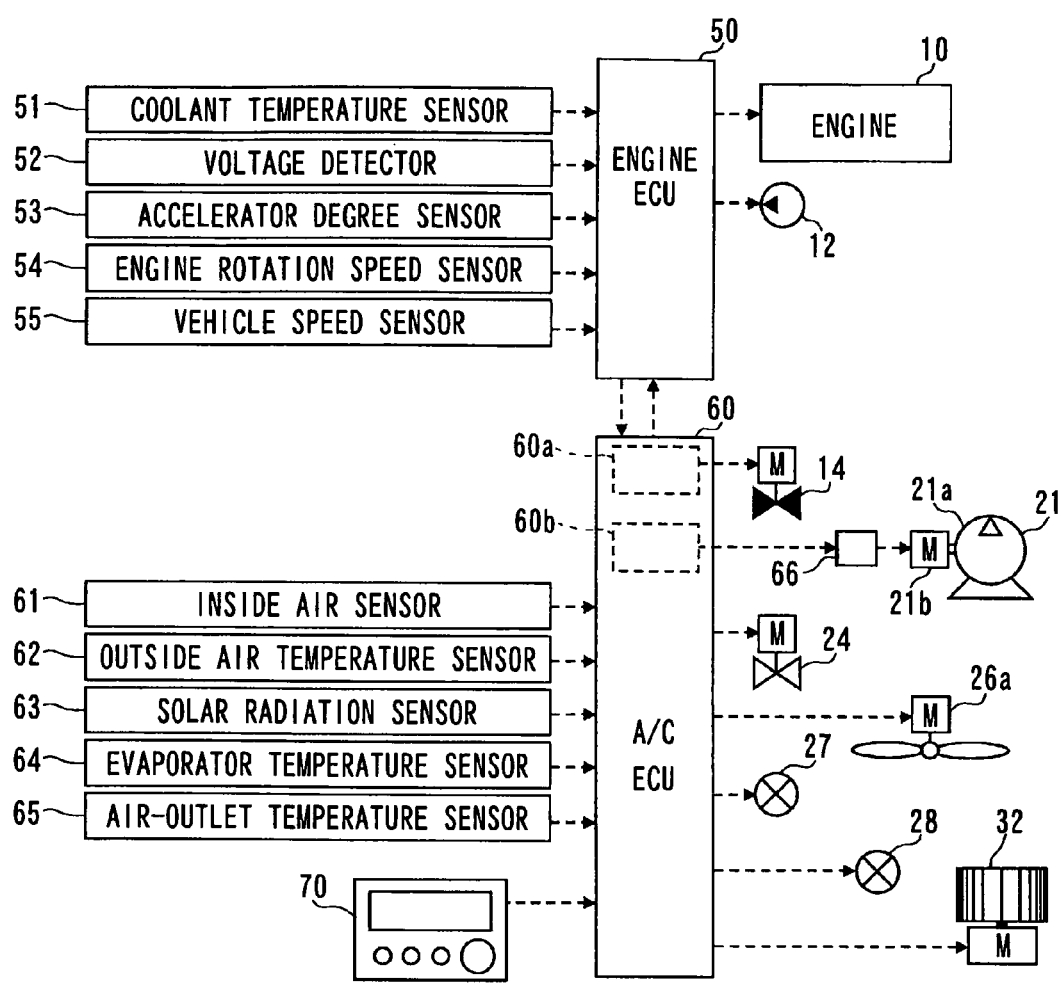
FIG. 2 is a block diagram showing an electric controller of the air conditioner for a vehicle in the first embodiment.

The electrical motor 21b is an alternate motor, in which its operation (e.g., rotation speed) is controlled by an alternate voltage output from an inverter 66 shown in FIG. 2. The inverter 66 outputs an alternate voltage of a frequency in accordance with a control signal output from an air conditioning controller 60 (A/C ECU) described later. The refrigerant discharge capacity of the compressor 21 can be changed and controlled by the rotational speed control of the electrical motor 21b. Thus, the electrical motor 21b is used as a discharge capacity changing portion of the compressor 21.

A refrigerant inlet side of the interior condenser 22 is connected to the refrigerant discharge side of the compressor 21. The interior condenser 22 is disposed in the air passage of the interior air-conditioning unit 30 at a downstream air side of the heater core 13, so that the refrigerant flowing through the interior condenser 22 is heat-exchanged with air having been passed through the interior evaporator 23 and the heater core 13.

Thus, the interior condenser 22 functions as a refrigerant radiator for cooling and condensing the refrigerant, and functions as a heating heat exchanger for heating air to be blown into the vehicle compartment. More specifically, the interior condenser 22, located downstream of the heater core 13 in the air flow direction, is used as an auxiliary heater (i.e., second heater) for further heating the air having been heated by the heater core 13 (i.e., main heater as first heater).

Generally, the temperature of the refrigerant flowing from the compressor 21 into the interior condenser 22 is increased in accordance with a pressure increase of the refrigerant discharged from the compressor 21. Thus, the heating capacity of the interior condenser 22 increases in accordance with an increase of the refrigerant discharge capacity of the compressor 21. Thus, the electrical motor 21b, used as the discharge capacity changing portion of the compressor 21, also functions as an auxiliary heating capacity changing portion of the interior condenser 22 used as the auxiliary heater.

The first electrical switching valve 27 is connected to a refrigerant outlet side of the interior condenser 22. The operation of the first electrical switching valve 27 is controlled based on a control signal output from the air conditioning controller 60. More specifically, the first electrical switching valve 27 switches between a refrigerant circuit connecting the refrigerant outlet side of the interior condenser 22 and a refrigerant inlet side of the exterior heat exchanger 26, and a refrigerant circuit connecting the refrigerant outlet side of the interior condenser 22 and a refrigerant inlet side of the fixed throttle 25.

The fixed throttle 25 is a heating decompression unit for decompressing and expanding the refrigerant flowing out of the first electrical switching valve 27 in the heating mode and in the dehumidifying and heating mode. For example, as the fixed throttle 25, a capillary tube or an orifice or the like may be used. A refrigerant outlet side of the fixed throttle 25 is connected to a refrigerant inlet side of the exterior heat exchanger 26.

The exterior heat exchanger 26 is disposed in the engine compartment, such that the refrigerant flowing in the exterior heat exchanger 26 is heat-exchanged with outside air (i.e., air outside the vehicle compartment) blown by a blower fan 26a. The blower fan 26a is an electrical fan, in which its rotational speed (air blowing amount) is controlled by a control voltage output from the air conditioning controller 60.

The blower fan 26a of the present embodiment is disposed to blow outside air to not only the exterior heat exchanger 26 but also the radiator 15 arranged in the coolant circuit 11, for example. More specifically, the exterior heat exchanger 26 and the radiator 15 are arranged, such that the outside air blown by the blower fan 26a flows through the exterior heat exchanger 26 and the radiator 15, in this order.

The second electrical switching valve 28 is connected to a refrigerant outlet side of the exterior heat exchanger 26. The basic structure of the second electrical switching valve 28 is similar to that of the first electrical switching valve 27. More specifically, the second electrical switching valve 28 switches between a refrigerant circuit connecting a refrigerant outlet side of the exterior heat exchanger 26 and a refrigerant inlet side of the electrical expansion valve 24, and a refrigerant circuit connecting the refrigerant outlet side of the exterior heat exchanger 26 and a refrigerant inlet side of an accumulator 29.

The electrical expansion valve 24 is a decompression unit configured to decompress and expand the refrigerant flowing out of the second electrical switching valve 28. The electrical expansion valve 24 is, for example, an electrical variable throttle mechanism in which a throttle passage area is adjusted by a control signal 20, output from the air conditioning controller 60. When the throttle passage area of the electrical expansion valve 24 becomes maximum, the refrigerant is not decompressed and not expanded while passing through the electrical expansion valve 24, and thereby the electrical expansion valve 24 functions as a refrigerant passage without throttling.

A refrigerant outlet side of the electrical expansion valve 24 is connected to a refrigerant inlet side of the interior evaporator 23. The interior evaporator 23 is disposed in the air passage of the interior air-conditioning unit 30 at an upstream side of the interior condenser 22 and the heater core 13 in the air flow direction. The interior evaporator 23 is a cooling heat exchanger, in which the refrigerant flowing therein is heat exchanged with air and is evaporated by absorbing heat from air so as to cool the air in the cooling mode and in the dehumidifying and heating mode.

A refrigerant inlet side of the accumulator 29 is connected to a refrigerant outlet side of the interior evaporator 23. The accumulator 29 is a low-pressure side gas-liquid separator, in which the refrigerant flowing therein is separated into gas refrigerant and liquid refrigerant, and surplus refrigerant is stored therein. A refrigerant suction port of the compressor 21 is connected to a gas refrigerant outlet of the accumulator 29.

Next, the interior air-conditioning unit 30 will be described. The interior air-conditioning unit 30 is located inside of an instrument panel (i.e., dash panel) positioned at the frontmost portion in the vehicle compartment. The interior air-conditioning unit 30 includes an air conditioning casing 31 forming an outer shell and defining the air passage. In the air conditioning casing 31, a blower 32, the interior evaporator 23, the heater core 13, the interior condenser 22, doors and the like are disposed.

The casing 31 defines the air passage through which air flows into the vehicle compartment. The casing 31 is made of a resin (e.g., polypropylene) having a suitable elasticity and being superior in the strength. An inside/outside air switching device (not shown) is located in the casing 31 at the most upstream side, to selectively introduce inside air or/and outside air in the casing 31.

The inside/outside air switching, device can be switched to any one air suction mode among an inside air mode, an outside air mode and an inside/outside air mixing mode. In the inside air mode, the inside/outside air switching device only introduces inside air into the casing 31. In the outside air mode, the inside/outside air switching device only introduces outside air into the casing 31. In the inside/outside air mixing mode, the inside/outside air switching device introduces both the inside air and the outside air into the casing 31. The operation of the inside/outside air switching device is controlled by a control signal output from the air conditioning controller 60.

The blower 32 is disposed in the casing 31 at a downstream air side of the inside/outside air switching device, to blow air drawn via the inside/outside air switching device toward the interior of the vehicle compartment. The blower 32 is an electrical blower having a centrifugal multi-blade fan and an electrical motor, for example. In this case, the centrifugal multi-blade fan is driven by the electrical motor, and the rotational speed (air blowing amount) of the electrical motor is controlled by a control voltage output from the air conditioning controller 60.

The interior evaporator 23 is disposed in the casing 31 at a downstream air side of the blower 32 to cross all the air passage area. At a downstream air side of the interior evaporator 23, the air passage of the casing 31 is provided with a first air passage 33 through which air after passing through the interior evaporator 23 flows, a second air passage 34 used as a cool air bypass passage through which air after passing through the interior evaporator 23 flows, and a mixing space 35 in which air from the first air passage 33 and air from the second air passage 34 are mixed.

In the first air passage 33, the heater core 13 and the interior condenser 22 are arranged, so that air dehumidified and cooled by the interior evaporator 23 flows through the heater core 13 and the interior condenser 22 in this order through the first air passage 33. On the other hand, cool air having passed through the interior evaporator 23 flows into the mixing space 35 through the second air passage 34 used as the cool air bypass passage while bypassing the heater core 13 and the interior condenser 22.

Thus, the temperature of air (i.e., conditioned air) mixed in the mixing space 35 is changed by adjusting a ratio between a flow amount of air passing through the first air passage 33 and a flow amount of air passing through the second air passage 34. In the present embodiment, an air mix door 38 is located downstream of the interior evaporator 23 at an inlet side of the first and second air passages 33, 34, so as to continuously change the air flow ratio flowing between the first and second air passages 33, 34.

The air mix door 38 is used as a temperature adjusting unit that adjusts the air temperature in the mixing space 35 so as to adjust the temperature of conditioned air to be blown into the vehicle compartment. The air mix door 38 is driven by an electrical actuator, and operation of the electrical actuator for the air mix door 38 is controlled by a control signal output from the air conditioning controller 60.

Furthermore, at the most downstream air side, the casing 31 is provided with plural air outlets (not shown) from which conditioned air, of the mixing space 35 is blown into the vehicle compartment that is a space to be air-conditioned. The air outlets are, for example, a face air outlet through which conditioned air is blown toward an upper side of a passenger in the vehicle compartment, a foot air outlet through which conditioned air is blown toward the foot area of the passenger in the vehicle compartment, and a defroster air outlet through which conditioned air is blown toward an inner surface of a windshield of the vehicle.

The face air outlet, the foot air outlet and the defroster air outlet are selectively opened and closed by an air-outlet mode switching member. For example, a face door is located upstream of the face air outlet to adjust an open area of the face air outlet; a foot door is located upstream of the foot air outlet to adjust an open area of the foot air outlet, and a defroster door is located upstream of the defroster air outlet to adjust an open area of the defroster air outlet.

That is, the face door, the foot door and the defroster door are configured to form the air-outlet mode switching member, and are operatively connected to be driven by an electrical actuator via a link mechanism, so as to set an air outlet mode. The operation of the electrical actuator for the air-outlet mode switching member is controlled by a control signal output from the air conditioning controller 60.

The air outlet mode includes a face mode, a bi-level mode, a foot mode and a foot/defroster mode. In the face mode, the face air outlet is fully opened so that conditioned air is blown toward the upper side of the passenger in the vehicle compartment from the face air outlet. In the bi-level mode, both the face air outlet and the foot air outlet are opened so that conditioned air is blown toward the upper and lower sides of the passenger in the vehicle compartment. In the foot mode, the foot air outlet is fully opened and the defroster air outlet is opened by a small open degree so that conditioned air is mainly blown from the foot air outlet. In the foot/defroster mode, the foot air outlet and the defroster air outlet are opened by approximately same open degree (e.g., half open degree), so that conditioned air is blown from both the foot air outlet and the defroster air outlet.

When a defroster switch of an operation panel 70 described later is manually operated by a passenger in the vehicle compartment, the defroster air outlet is fully opened so as to set a defroster mode in which conditioned air is blown from the defroster air outlet toward the inner surface of the windshield.

Next, an electrical control portion of the present embodiment will be described with reference to FIG. 2. The engine controller 50 and the air conditioning controller 60 are constructed by a generally know microcomputer including CPU, ROM and RAM, and circumference circuits. The engine controller 50 and the air conditioning controller 60 perform various calculations and processes based on control programs stored in the ROM, and perform control operation of various equipments connected to output sides of the engine controller 50 and the air conditioning controller 60.

For example, at an output side of the engine controller 50, the coolant pump 12 and various equipments of the engine 10 are connected. More specifically, a stator for starting the operation of the engine 10, a drive circuit of a fuel injection device for supplying fuel to the engine 10 and the like are connected to the output side of the engine controller 50.

At an input side of the engine controller 50, a sensor group is connected for controlling the engine 10. The sensor group includes a coolant temperature sensor 51 configured to detect a coolant temperature Tw of the engine coolant immediately after flowing out of the engine 10, a voltage detector 52 configured to detect an electrical voltage VB of a battery (not shown), an accelerator degree sensor 53 configured to detect a stepping degree of an accelerator of the vehicle, an engine rotation speed sensor 54 configured to detect an engine rotation speed Ne, a vehicle speed sensor 55 configured to detect a vehicle speed Vv, and the like.

The coolant temperature sensor 51 of the present embodiment is located to detect the temperature Tw of the engine coolant. The temperature of the engine coolant immediately after flowing out of the engine 10 is a temperature having a relation with the temperature of the engine 10 itself. Thus, in the engine controller 50 of the present embodiment, the detection value (coolant temperature Tw) of the coolant temperature sensor 51 is used as the temperature of the engine 10, and is used in the control of the coolant pump 12.

Various air-conditioning control equipments are connected to output sides of the air conditioning controller 60. The air-conditioning control equipments include the flow adjustment valve 14, the inverter 66 for the electrical motor 21b of the compressor 21, the electrical expansion valve 24, the blower fan 26a, first and second electrical switching valves 27, 28, the blower 32, the inside/outside air switching device, the electrical actuators for driving the air mix door 38 and for driving air-outlet mode doors, and the like.

The air conditioning controller 60 is integrally configured to have plural control portions, which control the various air-conditioning control equipments. The air conditioning controller 60 includes a heating capacity control portion 60a with a hardware configuration and a software configuration for controlling the flow adjustment valve 14 that is a heating capacity changing portion of the heater core 13.

A discharge capacity control portion 60b of the air conditioning controller 60 controls operation of the electrical motor 21b of the compressor 21, thereby controlling a refrigerant discharge capacity of the compressor 21. The electrical motor 21b is also used as a heating capacity changing portion of the interior condenser 22 used as a second heater (i.e., the auxiliary heater). Therefore, the discharge capacity control portion 60b is also used as a heating capacity control portion for controlling the operation of the electrical motor 21b so as to control the heating capacity of the interior condenser 22.

The heating capacity control portion 60a and the discharge capacity control portion (auxiliary heating capacity control portion) 60b may be configured separately from the air conditioning controller 60.

Air conditioning sensor group is connected to an input side of the air conditioning controller 60. For example, the air conditioning sensor group includes an inside air sensor 61 configured to detect a temperature Tr of the vehicle compartment, an outside air temperature sensor 62 configured to detect an outside air temperature Tam, a solar radiation sensor 63 configured to detect a solar radiation Ts entering to the vehicle compartment, an evaporator temperature sensor 64 configured to detect an air temperature Te blown from the interior evaporator 23, an air-outlet temperature sensor 65 configured to detect an air temperature Tout blown into the vehicle compartment and the like. The air temperature Te blown from the interior evaporator 23 corresponds to a refrigerant evaporation temperature in the interior evaporator 23.

The operation panel 70 is located near the instrument panel at the front portion of the vehicle compartment. The operation panel 70 is connected to the input side of the air conditioning controller 60, such that operation signals of various air-conditioning operation switches provided in the operation panel 70 are input to the air conditioning controller 60. For example, the various air-conditioning operation switches include an automatic operation switch of the air conditioner 1, a temperature setting switch configured to set a setting temperature Tset of the vehicle compartment, an operation mode selecting switch, an air outlet mode selecting switch, and an air amount setting switch of the blower 32, and the like.

The engine controller 50 and the air conditioning controller 60 are electrically connected to each other to communicate with each other. Based on detection signals or/and operation signals input from one of the engine controller 50 and the air conditioning controller 60, operation of various equipments connected to the other one of the engine controller 50 and the air conditioning controller 60 can be controlled. The engine controller 50 and the air conditioning controller 60 may be configured integrally as an integrated unit.

Figure 3A:
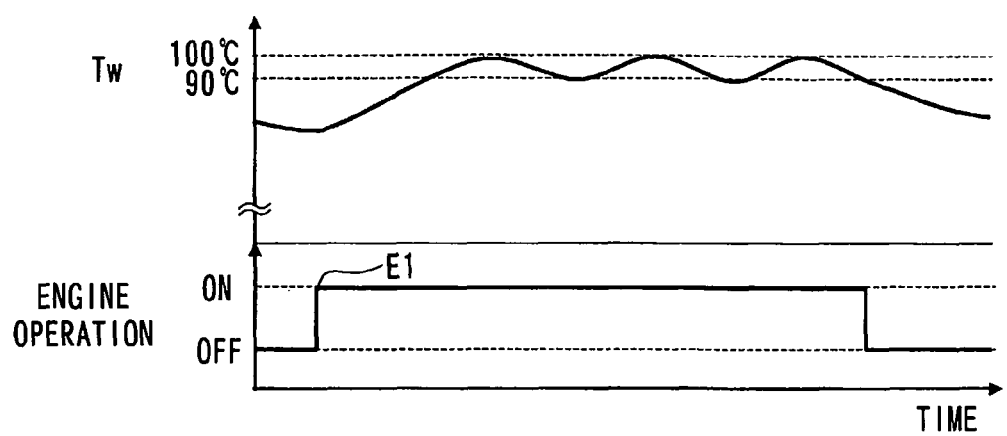
FIG. 3A is a graph showing a vibration in a coolant temperature Tw in an operation state of an engine.
Figure 3B:
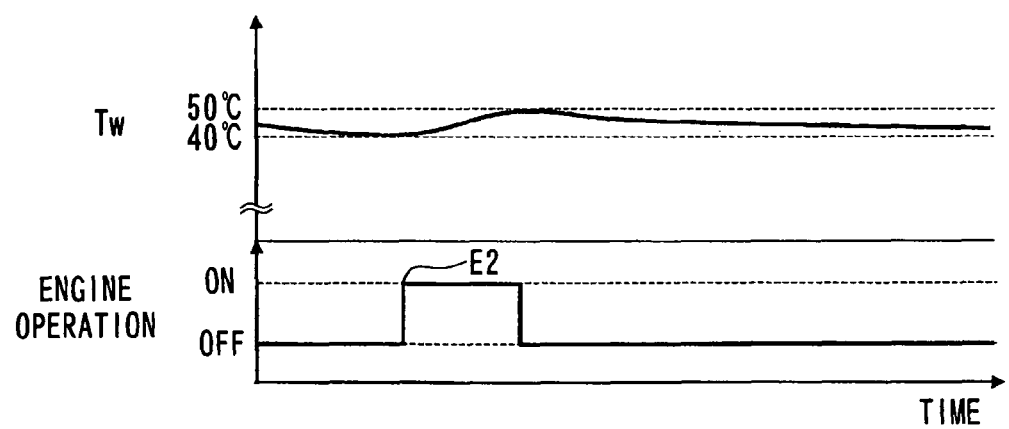
FIG. 3B is a graph showing a vibration in the coolant temperature Tw in a heating control of the engine, according to the first embodiment.
Figure 4:
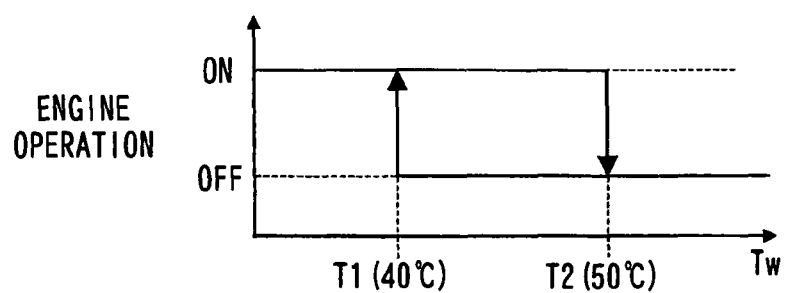
FIG. 4 is a graph showing a control characteristic in the heating control of the engine, according to the first embodiment.

Next, the operation of the present embodiment with the above configuration will be described. First, a basic operation of the engine controller 50 will be described with reference to FIGS. 3A and 3B. FIGS. 3A and 3B are graphs showing relationships between an operation state of the engine 10 and the coolant temperature Tw of the engine 10. FIG. 3A shows a variation of the coolant temperature Tw in a control state in which the engine 10 is operated for traveling the vehicle, and FIG. 3B shows a variation of the coolant temperature Tw in a heating control of the engine 10.

When a vehicle start switch is turned on so as to start a drive of the vehicle, the engine controller 50 detects a traveling load of the vehicle based on detection signals of the engine control sensor group 51 to 55, so as to operate or stop the engine 10 in accordance with the traveling load of the vehicle. At this time, the engine controller 50 causes the coolant pump 12 to be operated in accordance with operation of the engine 10.

Thus, when the engine 10 is operated, the engine coolant flows in the engine 10 to absorb exhaust heat from the engine 10 and to cool the engine 10. Then, the absorbed heat of the coolant is radiated to the atmosphere via the radiator 15. When the temperature of the engine coolant is lower than a predetermined temperature (e.g., 90° C.), a thermostat valve causes the engine coolant to flow toward the bypass passage side, and thereby a heat radiation is not performed in the radiator 15. Accordingly, when the engine 10 is operated, the engine coolant temperature Tw can be controlled within a predetermined coolant temperature range (e.g., 90° C. to 100° C.), as shown in FIG. 3A. As a result, the temperature of the engine 10 itself can be maintained in a predetermined engine temperature range corresponding to the predetermined coolant temperature range, thereby preventing an over-heating of the engine 10.

On the other hand, in a case where it is unnecessary for the engine 10 to be operated as a driving source of the traveling of the vehicle, the engine 10 is stopped, and thereby the temperature of the engine coolant is decreased.

In the present embodiment, when the coolant temperature Tw detected by the coolant temperature sensor 51 is lower than a first temperature T1 (e.g., 40° C.), the engine controller 50 causes the engine 10 to be operated so as to perform the heating control of the engine 10 regardless of the vehicle traveling state, until when the coolant temperature Tw becomes to a second temperature T2 (e.g., 50° C.) that is higher than the first temperature T1.

Thus, as shown in FIG. 3B, it can restrict the coolant temperature Tw from being lowered than the first temperature T1. Therefore, a generation of fluctuation in the temperature of the engine 10 itself can be restricted, thereby preventing an operation trouble of a catalyst for purifying exhaust gas. That is, the first temperature T1 is a predetermined temperature at which the engine 10 is required to be operated for performing the engine temperature control.

Here, a temperature difference between the first temperature T1 and the second temperature T2 is a hysteresis width for preventing a control hunting in the engine 10. Furthermore, the first temperature T1 is set to prevent the fluctuation of the engine temperature or to prevent an operation error of the catalyst for purifying the exhaust gas. In the present embodiment, the first temperature T1 is set at the same temperature as the temperature at which the heating of the engine 10 is required to suitably control both of the operation of the engine 10 and the performance of the catalyst.

In the heating control of the engine 10, the temperature Tw of the engine coolant flowing out of the engine 10, detected by the coolant temperature sensor 51, is used as the temperature of the engine 10, and the operation of the engine 10 is controlled so that the temperature of the engine 10 is approached to the first temperature T1 within a predetermined temperature range equal to or larger than the first temperature T1.

Figure 5:
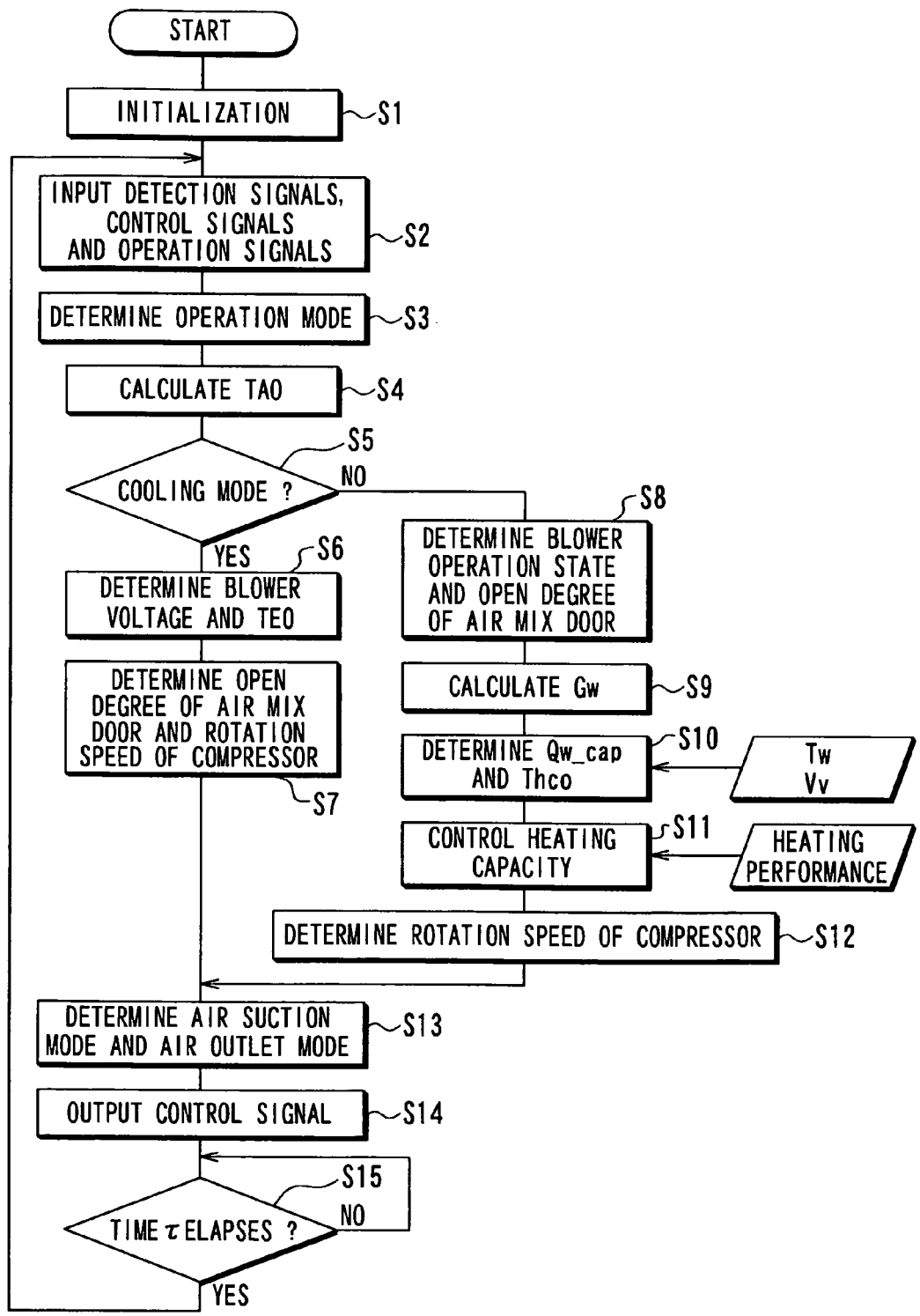
FIG. 5 is a flowchart showing control performed by the air conditioner for a vehicle, according to the first embodiment.

Next, operation of the vehicle air conditioner 1 of the present embodiment will be described with reference to FIG. 5. FIG. 5 is a flowchart showing a control process performed by the air conditioning controller 60 in the first embodiment. The control process is started by the air conditioning controller 60, when the automatic operation switch of the operation panel 70 is turned on in a state where the vehicle start switch is turned on.

First, at step S1, initialization of a flag, a timer, a control variable, etc. is performed. At step S2, detection signals of the sensor group (61-65), a control signal of the engine controller 50, and operation signals of the operation panel 70 are input.

Next, at step S3, an operation mode is determined based on an operation signal of the operation mode switch of the operation panel 70. Furthermore, at step S3, control states of the first and second electrical switching valves 27, 28 and the electrical expansion valve 24 are determined in accordance with the determined operation mode.

Specifically, in the cooling mode, the first electrical switching valve 27 is switched to a refrigerant circuit connecting the refrigerant outlet side of the interior condenser 22 with the refrigerant inlet side of the exterior heat exchanger 26, the second electrical switching valve 28 is switched to a refrigerant circuit connecting the refrigerant outlet side of the exterior heat exchanger 26 with the refrigerant inlet side of the electrical expansion valve 24, and the electrical expansion valve 24 is controlled to a throttle state having a decompression action.

In the heating mode, the first electrical switching valve 27 is switched to a refrigerant circuit connecting the refrigerant outlet side, of the interior condenser 22 with the refrigerant inlet side of the fixed through 25, and the second electrical switching valve 28 is switched to a refrigerant circuit connecting the refrigerant outlet side of the exterior heat exchanger 26 with the refrigerant inlet side of the actuator 29.

Furthermore, in the dehumidifying and heating mode, the first electrical switching valve 27 is switched to the refrigerant circuit connecting the refrigerant outlet side of the interior condenser 22 with the refrigerant inlet side of the fixed throttle 25, the second electrical switching valve 28 is switched to the refrigerant circuit connecting the refrigerant outlet side of the exterior heat exchanger 26 with the refrigerant inlet side of the electrical expansion valve 24, and the electrical expansion valve 24 is controlled to a fully open state without a decompression action.

At step S4, a target air temperature TAO of air blown into the vehicle compartment is calculated. The target air temperature TAO is calculated based on the following formula F1.

$$TAO = Kset \times Tset - Kr \times Tr - Kam \times Tam - Ks \times Ts + C \quad \text{(F1)}$$

Here, Tset is a set temperature set by the temperature setting switch, Tr is an inside air temperature detected by the inside air sensor 61, Tam is an outside air temperature detected by the outside air sensor 62, Ts is a solar radiation amount detected by the solar radiation sensor 63, Kset, Kr, Kam, Ks are control gains, and C is a constant.

Then, at step S5, it is determined whether the operation mode determined at step S3 is a cooling mode. When the operation mode determined at step S3 is the cooling mode, the control program is moved to step S6. Step S6 determines a blower voltage applied to the electrical motor of the blower 32 so as to determine an air blowing amount of the blower 32, and determines a target refrigerant evaporation temperature TEO of the interior evaporator 23, by respectively using control maps stored in the air conditioning controller 60.

For example, in the control map for determining the blower voltage of the present embodiment, the blower voltage is set at a maximum value in a lowest temperature area of the TAO and in a highest temperature area of the TAO, so as to control the air blowing amount Ga of the blower 32 at a maximum air amount. Furthermore, the control map for determining the blower voltage is set such that the blower voltage is gradually reduced as toward a middle temperature area from the lowest temperature area and the highest temperature area, thereby gradually reducing the air blowing amount Ga. In the control map for determining the blower voltage, the blower voltage is set at a lowest value in the middle temperature area. The control map of the target refrigerant evaporation temperature TEO is determined such that the TEO increases as the TAO increases.

Next, at step S7, the open degree of the air mix door 38 is determined by using a feedback control, such that an air temperature Tout detected by the air temperature sensor 65 is approached to the target air temperature TAO to be blown into the vehicle compartment. Furthermore, the rotational speed of the electrical motor 21b of the compressor 21 is determined by using a feedback control, such that a refrigerant evaporation temperature Te detected by the evaporator temperature sensor 64 is approached to the target refrigerant evaporation temperature TEO. More specifically, the frequency of the alternate output from the inverter 66 is determined so as to determine the rotational speed of the electrical motor 21b of the compressor 21.

In contrast, when the operation mode determined at step S5 is not the cooling mode, that is, when the operation mode determined at step S5 is the heating mode or the dehumidifying and heating mode, the control program moves to step S8.

At step S8, the air blowing amount Ga of the blower 32 is determined similarly to step S6. In addition, the open degree of the air mix door 38 is set at the maximum heating position at which the first air passage 33 for heating is fully opened and the second air passage 34 as the cool air bypass passage is fully closed. Thus, in this case, it can prevent air having passed through the interior evaporator 23 from flowing into the second air passage 34, and thereby all air from the interior evaporator 23 passes through the heater core 13 and the interior condenser 22 in the first air passage 33. Thus, heating capacity of the heater core 13 and the interior condenser 22 can be reduced.

Next, at step S9, the flow amount Gw of the engine coolant flowing to the heater core 13 is determined, based on a control signal (e.g., discharge flow amount of the coolant pump 12) output to the coolant pump 12 from the engine controller 50, and a control signal (e.g., valve open degree of the flow adjustment valve 14) output to the flow adjustment valve 14 from the engine controller 50. The control signal of the discharge flow amount of the coolant pump 12 and the control signal of the valve open degree of the flow adjustment valve 14 are input from the engine controller 50 to the air conditioning controller 60.

The heater core 13 is configured to perform heat exchange between the engine coolant and air to be blown into the vehicle compartment, thereby heating the air to be blown into the vehicle compartment. In the heater core 13, the air passing therethrough absorbs heat from the engine coolant flowing therein. Thus, the temperature of the engine coolant flowing out of the heater core 13 is lower than the temperature of the engine coolant flowing into the heater core 13, that is, lower than the coolant temperature Tw immediately after flowing out of the engine 10.

In the present embodiment, the engine controller 50 performs the heating control as described above. Thus, when the temperature of the engine coolant flowing out of the heater core 13 is excessively decreased, the coolant temperature Tw flowing from the heater core 13 into the engine 10 may be easy to be lower than the first temperature T1. Accordingly, in this case, the operation number for starting the operation of the engine 10 due to the engine heating control may be increased, or a heating delay of the engine 10 may be caused.

That is, when the temperature of the engine coolant flowing out of the heater core 13 is excessively decreased, the engine 10 may be required to be operated only in order to obtain a necessary heating source in the heater core 13, thereby deteriorating the fuel consumption.

Then, at step S10 of the present embodiment, an allowable heating capacity Qw_cap of the engine coolant in the heater core 13 is determined, such that the temperature of the engine 10 is approached to the first temperature T1 within the temperature range equal to or higher than the first temperature T1, in a case where the engine coolant flowing out of the heater core 13 and the engine coolant returning to the engine 10 from the radiator 15 are joined to be returned to the engine 10.

The allowable heating capacity Qw_cap causes the engine coolant flowing out of the heater core 13 to be approached to the first temperature T1 in a temperature range of the engine 10 equal to or higher than the first temperature T1 when the engine coolant flowing out of the heater core 13 returns to the engine 10, even when engine coolant is radiated in the heater core 13 to lose its heat quantity.

Specifically, the allowable heating capacity Qw_cap is determined by using a control map stored in the air conditioning controller 60 based on the coolant temperature Tw. For example, as in the solid line of FIG. 6, in an increase stage of the coolant temperature Tw, until the coolant temperature Tw becomes a predetermined temperature tk2, the allowable heating capacity Qw_cap is maintained at the minimum value (MIN). After the coolant temperature Tw is increased to the predetermined temperature tk2, the allowable heating capacity Qw_cap is increased as the coolant temperature Tw increases from the predetermined temperature tk2 to a predetermined temperature tk4. Thereafter, when the coolant temperature Tw is equal to or higher than the predetermined temperature tk4, the allowable heating capacity Qw_cap is maintained at the maximum value (MAX).

In contrast, in a decrease stage of the coolant temperature Tw, until the coolant temperature Tw becomes a predetermined temperature tk3, the allowable heating capacity Qw_cap is maintained at the maximum value (MAX). After the coolant temperature Tw is decreased to the predetermined temperature tk3, the allowable heating capacity Qw_cap is decreased as the coolant temperature Tw decreases to the predetermined temperature tk1. Thereafter, when coolant temperature Tw is equal to or lower than the predetermined temperature tk1, the allowable heating capacity Qw_cap is maintained at the minimum value (MIN).

Further, when the coolant temperature Tw is equal to or lower than the predetermined temperature tk1, the air conditioning controller 60 outputs a heating prohibition signal for prohibiting the heating control, to the engine controller 50. In addition, in the present embodiment, the above-described predetermined temperatures have the following relationships of the first temperature $T1 < tk1 < tk2 < tk3 < tk4$.

In the air conditioning controller 60 of the present embodiment, the control map for determining the allowable heating capacity Qw_cap is changed in accordance with the vehicle speed Vv detected by the vehicle speed sensor 55 obtained from the engine controller 50. More specifically, at a high vehicle speed in which the vehicle speed Vv becomes equal to or higher than a predetermined standard vehicle speed KVv, the allowable heating capacity Qw_cap is determined by using the above control map.

Figure 6:
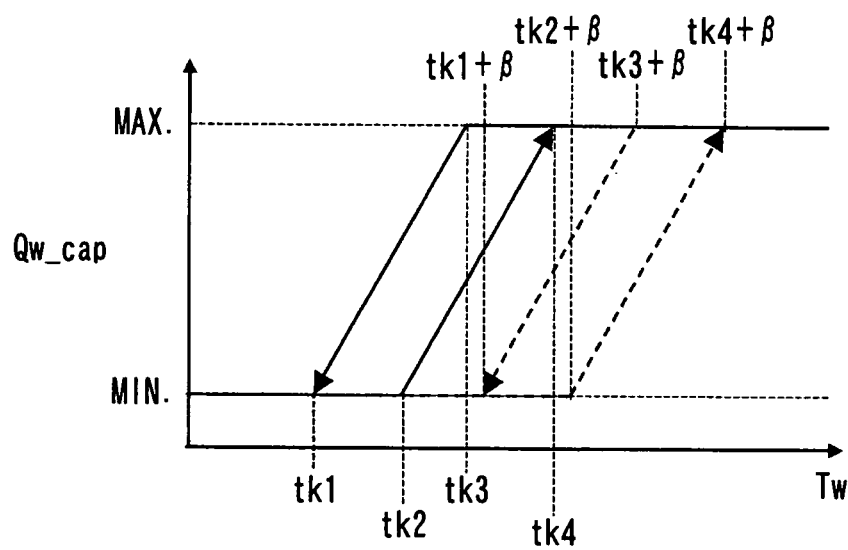
FIG. 6 is a graph showing a control characteristic of an allowable heating capacity Qw_Cap based on a coolant temperature Tw, according to the first embodiment.

In contrast, at a low vehicle speed in which the vehicle speed Vv becomes lower than the predetermined standard vehicle speed KVv, the allowable heating capacity Qw_cap is determined by using the above control map of FIG. 6 to be changed based on addition values by respectively adding a temperature β to the predetermined values tk1-tk4. Thus, in the low vehicle speed, the allowable heating capacity Qw_cap can be reduced as compared with that in the high vehicle speed, so that the temperature of the engine 10 itself can be maintained at a high temperature when the engine coolant flowing out of the heater core 13 returns to the engine 10, as compared with the high vehicle speed.

Furthermore, in step S10, a temperature Thco of air after passing through the heater core 13 is calculated when the allowable radiating amount of the heater core 13 becomes in the allowable heating capacity Qw_cap. The temperature Thco of air after passing through the heater core 13 can be calculated based on a balance point between the heating capacity of the engine coolant and the heat absorbing capacity of the blown air. It is because that a total heat quantity radiated in the engine coolant becomes equal to a total heat quantity of air absorbed, at the balance point.

Here, the total heat quantity of the radiation heat of the engine coolant at the heater core 13 is the allowable heating capacity Qw_cap. The total heat quantity Q(total) of air absorbed at the heater core 13 can be obtained by the following formula: $Q(total) = (Thco - Tin) \times Ga$. Here, the Thco is the temperature of air flowing out of the heater core 13, Tin is the temperature of air flowing into the heater core 13, and Ga is the air blowing amount. In the present embodiment, the temperature Tin of air flowing into the heater core 13 corresponds to the refrigerant evaporation temperature Te in the interior evaporator 23.

Next, at step S11, the heating capacity of the heater core 13 is controlled. For example, the flow amount Gw of the engine coolant is controlled based on the allowable heating capacity Qw_cap determined at step S10, by using the control map stored in the air conditioning controller 60, so that the heating capacity of the heater core 13 becomes to the allowable heating capacity Qw_cap.

More specifically, at step S11 of the present embodiment, the operation state of the heating capacity changing portion, e.g., the open degree of the flow adjustment valve 14 is determined. For example, the open degree of the flow adjustment valve 14 is determined such that the flow amount of the engine coolant flowing through the heater core 13 is increased in accordance with an increase of the engine coolant temperature Tw before flowing into the heater core 13.

As an example, the flow adjustment valve 14 is fully closed when the allowable heating capacity Qw_cap determined at step S10 becomes minimum, and the flow adjustment valve 14 is fully opened when the allowable heating capacity Qw_cap determined at step S10 becomes maximum.

Figure 7:
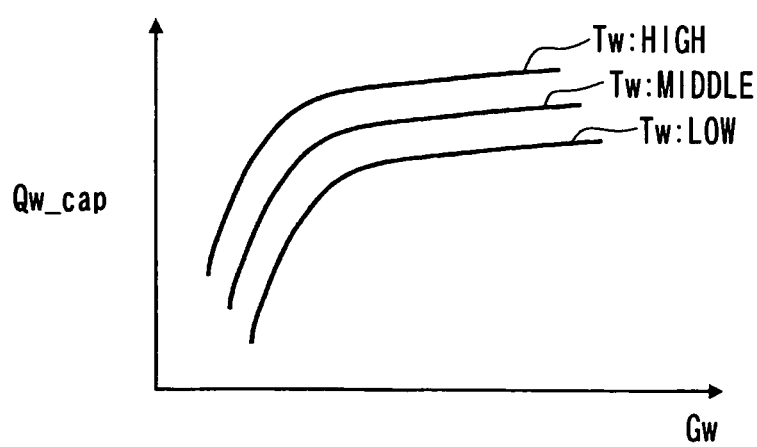
FIG. 7 is a graph showing a relationship between the coolant temperature Tw, a coolant flow amount Gw and the allowable heating capacity Qw_cap, according to the first embodiment.

The control map used at step S11 is determined based on the relationship of FIG. 7, in which the allowable heating capacity Qw_cap is increased in accordance with an increase of the flow amount Gw of the engine coolant and an increase of the coolant temperature Tw. Furthermore, when the flow amount Gw of the engine coolant is large, an increase degree of the allowable heating capacity Qw_cap is reduced as compared that when the flow amount Gw of the engine coolant is small, in consideration of the heat exchange performance of the heater core 13.

Next, at step S12, the rotational speed of the electrical motor 21*b* of the compressor 21 is determined by using the feedback control so as to determine the heating capacity of the interior condenser 22, such that the air temperature Tout detected by the air temperature sensor 65 is approached to the target air temperature TAO. Then, the control process moves to step S13.

At step S12, the rotation speed of the electrical motor 21*b* of the compressor 21 can be increased in accordance with an increase of the temperature difference (Thco−TAO) of subtracting the temperature Thco of air blown from the heater core 13, determined at step S10, from the target air temperature TAO.

Next, at step S13, an air suction mode of the inside/outside air switching device and an air outlet mode of the interior air conditioning unit 30 are determined based on the target air temperature TAO, by using a control map stored in the air conditioning controller 60. Generally, the inside/outside air switching device is operated to preferentially set the outside air mode for introducing outside air. However, for example, in a case where a high cooling performance is required in an extremely low temperature area of the TAO, the inside air mode is selected so as to introduce the inside air into the inside/outside air switching device.

The air outlet mode is selected in this order of the foot mode, the bi-level mode and the face mode, as the TAO increases from a low temperature area to a high temperature area. For example, in the summer, the face mode is mainly selected as the air outlet mode. In the spring and autumn, the bi-level mode is generally selected. Furthermore, in the winter, the foot mode is mainly selected.

Then, at step S14, control signals are output from the air conditioning controller 60 to various air-conditioning control equipments, such that the control states determined at steps S6 to S13 can be obtained. For example, a control signal is output to the inverter 66 of the electrical motor 21b of the compressor 21, so that the rotation speed of the compressor 21 is approached to the rotational speed determined at step S7 or S12.

Next, at step S15, it is determined whether a control period elapses. When it is determined that the control period τ elapses at step S15, the control program returns to step S2.

The vehicle air conditioner 1 of the present embodiment is operated based on an operation mode selected at step S3. Next, the operation mode of the vehicle air conditioner 1 will be described in detail.

(a) Cooling Mode

In the cooling mode, the first electrical switching valve 27 is set to connect the refrigerant outlet side of the interior condenser 22 with the refrigerant inlet side of the exterior heat exchanger 26, the second electrical switching valve 28 is set to connect the refrigerant outlet side of the exterior heat exchanger 26 with the refrigerant inlet side of the electrical expansion valve 24, and the electrical expansion valve 24 is controlled to a throttle state having a decompression action.

Thus, a vapor-compression refrigerant cycle is configured such that the refrigerant is circulated in this order of the compressor 21→the interior condenser 22→the first electrical switching valve 27→the exterior heat exchanger 26→the second electrical switching valve 28→the electrical expansion valve 24→the interior evaporator 23→the accumulator 29→the compressor 21. That is, in the cooling mode, the interior condenser 22 and the exterior heat exchanger 26 are adapted as a condenser (refrigerant radiator), and the interior evaporator 23 is adapted as a refrigerant evaporator.

Thus, in the cooling mode, the air blown by the blower 32 is cooled by the interior evaporator 23. The cool air cooled by the interior evaporator 23 flows into the first air passage 33 and the second air passage 34 in accordance with the open degree of the air mix door 38.

The cool air flowing into the first air passage 33 from the interior evaporator 23 is heated while passing through the heater core 13 and the interior condenser 22, and is mixed in the mixing space 35 with the cool air passing through the second air passage 34 adapted as the cool air bypass passage. Then, cool air having a desired temperature is conditioned in the mixing space 35, and is blown into the vehicle compartment from the mixing space 35 via the air outlets. Thus, the cooling of the vehicle compartment is performed.

The cooling mode is an operation mode for mainly blowing cool air into the vehicle compartment. Therefore, in the cooling mode, the open degree of the air mix door 38 is controlled so that a flow amount of cool air flowing into the first air passage 33 becomes smaller than a flow amount of cool air flowing into the second air passage 34. Therefore, in the cooling mode, the air conditioning controller 60 does not control the open degree of the flow adjustment valve 14. For example, the open degree of the flow adjustment valve 14 is maintained at a certain degree, in the cooling mode. In the cooling mode, the open degree of the flow adjustment valve 14 may be set at a fully open degree, or may be set at a fully close degree.

(b) Heating Mode and Dehumidifying and Heating Mode

In the heating mode, the first electrical switching valve 27 is set to connect the refrigerant outlet side of the interior condenser 22 with the refrigerant inlet side of the fixed through 25, and the second electrical switching valve 28 is set to connect the refrigerant outlet side of the exterior heat exchanger 26 with the refrigerant inlet side of the actuator 29.

Thus, a vapor-compression refrigerant cycle is configured such that the refrigerant is circulated in this order of the compressor 21→the interior condenser 22→the first electrical switching valve 27→the fixed throttle 25→the exterior heat exchanger 26→the second electrical switching valve 28→the accumulator 29→the compressor 21. That is, in the heating mode, the interior condenser 22 is adapted as a condenser (refrigerant radiator), and the exterior heat exchanger 26 is adapted as a refrigerant evaporator. Therefore, in the heating mode, refrigerant does not flow into the evaporator 23, and air is not cooled while passing through the evaporator 23.

Thus, in the heating mode, air blown by the blower 32 flows, into the first air passage 33 for heating, without being cooled at the interior evaporator 23. The air flowing into the first air passage 33 is heated while passing through the heater core 13 and the interior condenser 22, and is mixed in the mixing space 35 with the air passing through the second air passage 34, so that warm air having the target air temperature TAO can be obtained in the mixing space 35. Thereafter, the warm air is blown into the vehicle compartment from the mixing space 35 via the air outlets. Thus, the heating of the vehicle compartment can be effectively performed.

Furthermore, in the dehumidifying and heating mode, the first electrical switching valve 27 is set to connect the refrigerant outlet side of the interior condenser 22 with the refrigerant inlet side of the fixed throttle 25, the second electrical switching valve 28 is set to connect the refrigerant outlet side of the exterior heat exchanger 26 with the refrigerant inlet side of the electrical expansion valve 24, and the electrical expansion valve 24 is controlled to the fully open state without a decompression action.

Thus, a vapor-compression refrigerant cycle is configured such that the refrigerant is circulated in this order of the compressor 21→the interior condenser 22→the first electrical switching valve 27→the fixed throttle 25→the exterior heat exchanger 26→the second electrical switching valve 28 (→the electrical expansion valve 24)→the interior evaporator 23→the accumulator 29→the compressor 21. That is, in the heating and dehumidifying mode, the interior condenser 22 is adapted as a condenser (refrigerant radiator), and the exterior heat exchanger 26 and the interior evaporator 23 are adapted as refrigerant evaporators.

Thus, in the dehumidifying and heating mode, air blown by the blower 32 is cooled and dehumidified in the interior evaporator 23, and then flows into the first air passage 33 for heating. The cool air flowing into the first air passage 33 is heated while passing through the heater core 13 and the interior condenser 22, and is mixed in the mixing space 35 with the cool air passing through the second air passage 34, so that warm air having the target air temperature TAO can be obtained in the mixing space 35. Thereafter, the warm air is blown into the vehicle compartment from the mixing space 35 via the air outlets. Thus, the dehumidifying and heating of the vehicle compartment can be effectively performed.

At this time, air passes through the heater core 13 and the interior condenser 22 in this order in the air passage 33, so that air heated in the heater core 13 is re-heated in the interior condenser 22. Furthermore, the heating capacity of the interior condenser 22 is controlled so that the temperature of air to be blown into the vehicle compartment is approached to the target air temperature TAO.

Thus, even when the exhaust heat of the engine 10, which heats the engine coolant, is insufficient to heat air to be blown into the vehicle compartment to a desired temperature (i.e., target air temperature TAO), the temperature of air to be blown into the vehicle compartment can be sufficiently increased to the desired temperature by using the heating capacity of the interior condenser 22. Therefore, the heating or the dehumidifying and heating of the vehicle compartment can be suitably performed.

In the present embodiment, the flow amount Gw of the engine coolant flowing into the heater core 13 is controlled such that the temperature of the engine 10 itself is approached to the first temperature T1 in the predetermined temperature range equal to or higher than the first temperature T1, in a case where the engine, coolant is returned to the engine 10 after passing through the heater core 13. Thus, it can prevent the temperature of the engine 10 itself from being lower than the first temperature T1.

Furthermore, in the heating mode and in the dehumidifying and heating mode, when the coolant temperature Tw is lower than the predetermined temperature tk1, the air conditioning controller 60 outputs a heating prohibition signal to the engine controller 50. Thus, even when the coolant temperature Tw is decreased by using the exhaust heat of the engine 10 in the heating or in the dehumidifying and heating of the vehicle compartment, it can prevent the engine 10 from being unnecessary operated due to the heating or the dehumidifying and heating of the vehicle compartment, thereby preventing the fuel consumption from being deteriorated.

Figure 8:
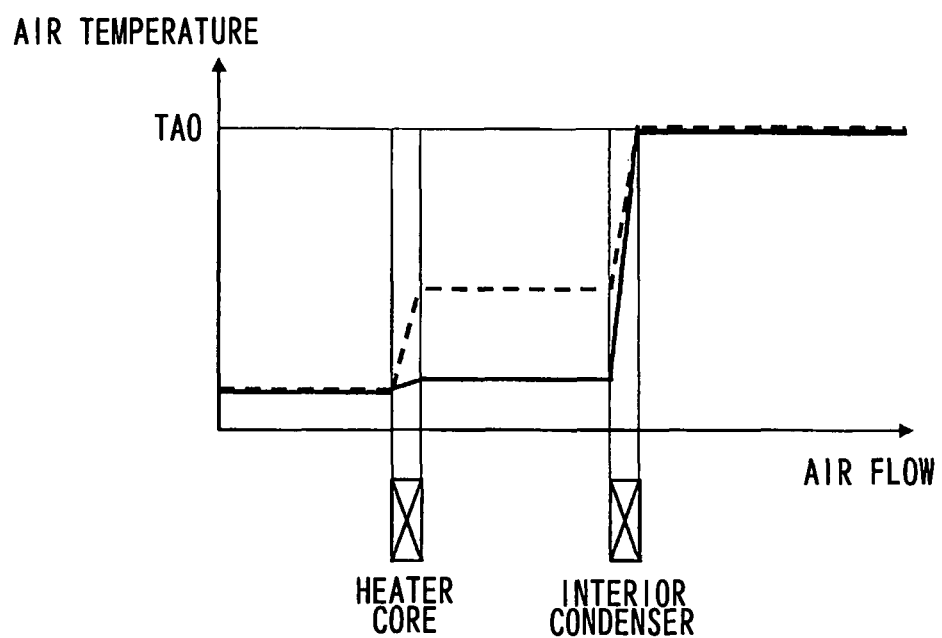
FIG. 8 is a schematic diagram showing a temperature variation in air passing through a heater core and an interior heat exchanger (i.e., interior condenser), according to the first embodiment.
Figure 9A:
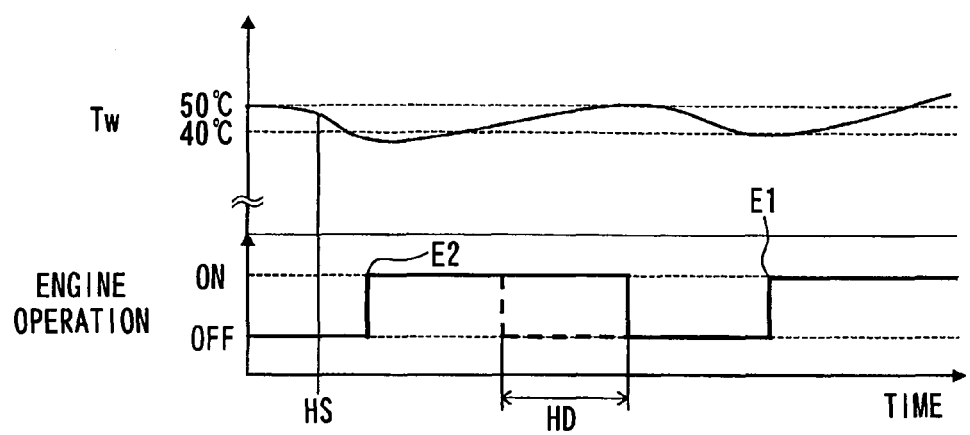
FIG. 9A is a graph showing a vibration in a coolant temperature Tw in a case without performing a heating capacity control of a heater core.
Figure 9B:
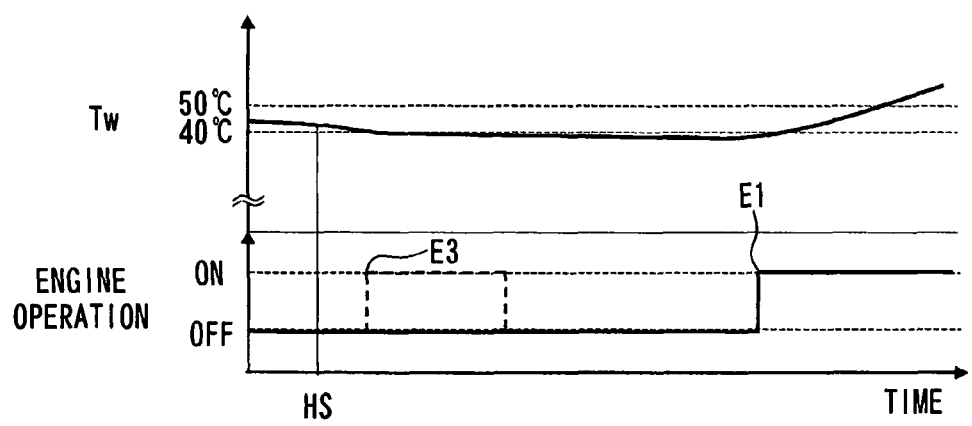
FIG. 9B is a graph showing a vibration in the coolant temperature Tw in a heating capacity control according to the first embodiment.

As a result, the heating or the dehumidifying and heating of the vehicle compartment can be suitably performed by suitably using the exhaust heat of the engine 10 while preventing deterioration of the fuel consumption. The detail will be described with reference to FIGS. 8, 9A and 9B. FIG. 8 is a schematic diagram showing a temperature variation in air passing through the heater core 13 and the interior condenser 22, according to the present embodiment. FIG. 9A is a graph showing an operation state of the engine 10 and the coolant temperature Tw, in a case without performing a heating capacity control of the heater core, and FIG. 9B is a graph showing an operation state of the engine 10 and the coolant temperature Tw, in a heating capacity control of the present embodiment.

The chain line graph of FIG. 8 shows a temperature variation in air flowing out of the heater core 13 by using the engine coolant as the heat source in a vehicle air conditioner without performing the heating capacity control of the heater core 13 of the present embodiment.

In this case without performing the heating capacity control of the heater core 13, as shown in FIG. 9A, the coolant temperature Tw may become lower than the first temperature T1, and the operation number for stating the operation of the engine 10 is easily increased. Furthermore, in this case, the engine coolant may radiate heat to air while the engine 10 is operated for the heating control of the engine 10. Therefore, the heating of the engine 10 may delay, because the time, for which the coolant temperature Tw is increased to equal to or higher than the second temperature T2, becomes longer. In FIG. 9A, E1 indicates an engine operation for outputting a driving force to the vehicle, E2 indicates an engine operation for increasing the coolant temperature Tw, HS indicates a start timing of the heating operation of the vehicle compartment, and HD indicates a delay time of the engine heating control.

In contrast, in the present embodiment, the heating capacity control portion 60a reduces the valve open degree of the flow adjustment valve 14. Therefore, as in the solid line graph of FIG. 8, the exhaust heat of the engine 10 can be used for the heating of the vehicle compartment while the heating capacity of the heater core 13 can be restricted.

Accordingly, even when the engine coolant flowing out of the heater core 13 returns to the engine 10, the coolant temperature Tw can be easily kept at a temperature equal to or higher than the first temperature T1. Furthermore, in the heating mode and in the dehumidifying and heating mode, when the coolant temperature Tw is lower than the predetermined temperature tk1, the air conditioning controller 60 outputs the heating prohibition signal to the engine controller 50. Therefore, as shown in FIG. 9B, the engine 10 is not operated at E3 even when the coolant temperature Tw is lower than the first temperature T1.

At this time, because the heating capacity of the heater core 13 is controlled to the allowable heating capacity Qw_cap such that the temperature of the engine 10 becomes equal to or higher than the first temperature T1, it is possible for the temperature of the engine 10 to be suitably controlled. Even if the heating control of the engine 10 is performed when the coolant temperature Tw is lower than the first temperature T1, the heat radiation amount of the engine coolant to air is restricted, and thereby the coolant temperature Tw can be rapidly increased. Thus, a heating delay of the engine 10 can be prevented.

As a result, according to the present embodiment, the heating or the dehumidifying and heating of the vehicle compartment can be suitably performed by suitably using the exhaust heat of the engine 10 while preventing deterioration of the fuel consumption in the vehicle.

In the present embodiment, the heater core 13 that is a heating heat exchanger is used as an air heater, and the flow adjustment valve 14 is used as the heating capacity changing portion of the heater core 13. Therefore, the heating capacity changing portion of the heater core 13 can be easily configured with a simple structure.

Furthermore, in the present embodiment, the control map for determining the allowable heating capacity Qw_cap is changed in accordance with the vehicle speed Vv, such that the temperature of the engine 10 itself can be set higher in the low vehicle speed as compared that in the high vehicle speed.

Thus, even when the coolant temperature Tw is rapidly decreased by the engine coolant flowing from the heater core 13 into the engine 10 in a case where the exhaust heat of the engine 10 becomes smaller in a low-speed vehicle traveling or in an engine-idling, it can effectively restrict the temperature of the engine 10 itself from being lowered than the first temperature T1.

Second Embodiment

Figure 10:
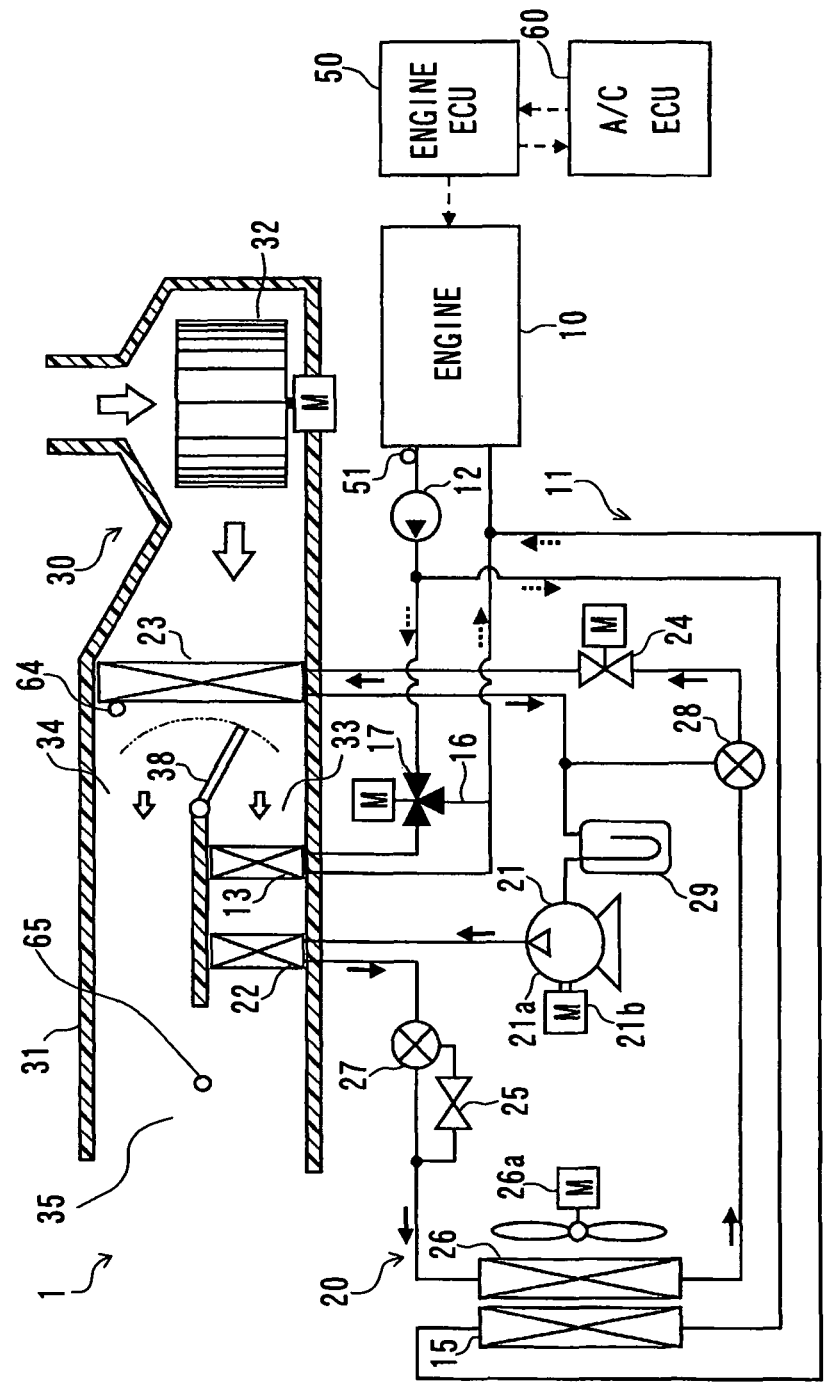
FIG. 10 is a schematic diagram showing an air conditioner for a vehicle according to a second embodiment of the invention.

A second embodiment of the invention will be described with reference to FIGS. 5 and 10.

In the above-described first embodiment, the flow adjustment valve 14 is used as an example of the heating capacity changing portion. However, in the second embodiment, the flow adjustment valve 14 is omitted, and a bypass passage 16 and an open degree adjustment valve 17 are used as the heating capacity changing portion. The bypass passage 16 is configured such that the coolant flows through the bypass passage 16 while bypassing the heater core 13. Furthermore, the open degree adjustment valve 17 is configured to adjust an open degree of the bypass passage 16 so as to change the flow amount of the engine coolant flowing through the heater core 13.

Furthermore, in the present embodiment, at step S11 of FIG. 5, the flow amount Gw of the coolant is determined such that the heating capacity of the heater core 13 is approached to the allowable heating capacity Qw_cap, and the open degree of the open degree adjustment valve 17 is determined so that the determined flow amount Gw of the coolant can be obtained. Other configurations and control operation of the present embodiment are similar to those of the above-described first embodiment.

As a result, in the vehicle air conditioner 1 of the present embodiment, similarly to the above first embodiment, the heating or the dehumidifying and heating of the vehicle compartment can be suitably performed by suitably using the exhaust heat of the engine 10 while preventing deterioration of the fuel consumption in the vehicle. Furthermore, the heating capacity changing portion can be easily configured with a simple structure.

Third Embodiment

Figure 11:
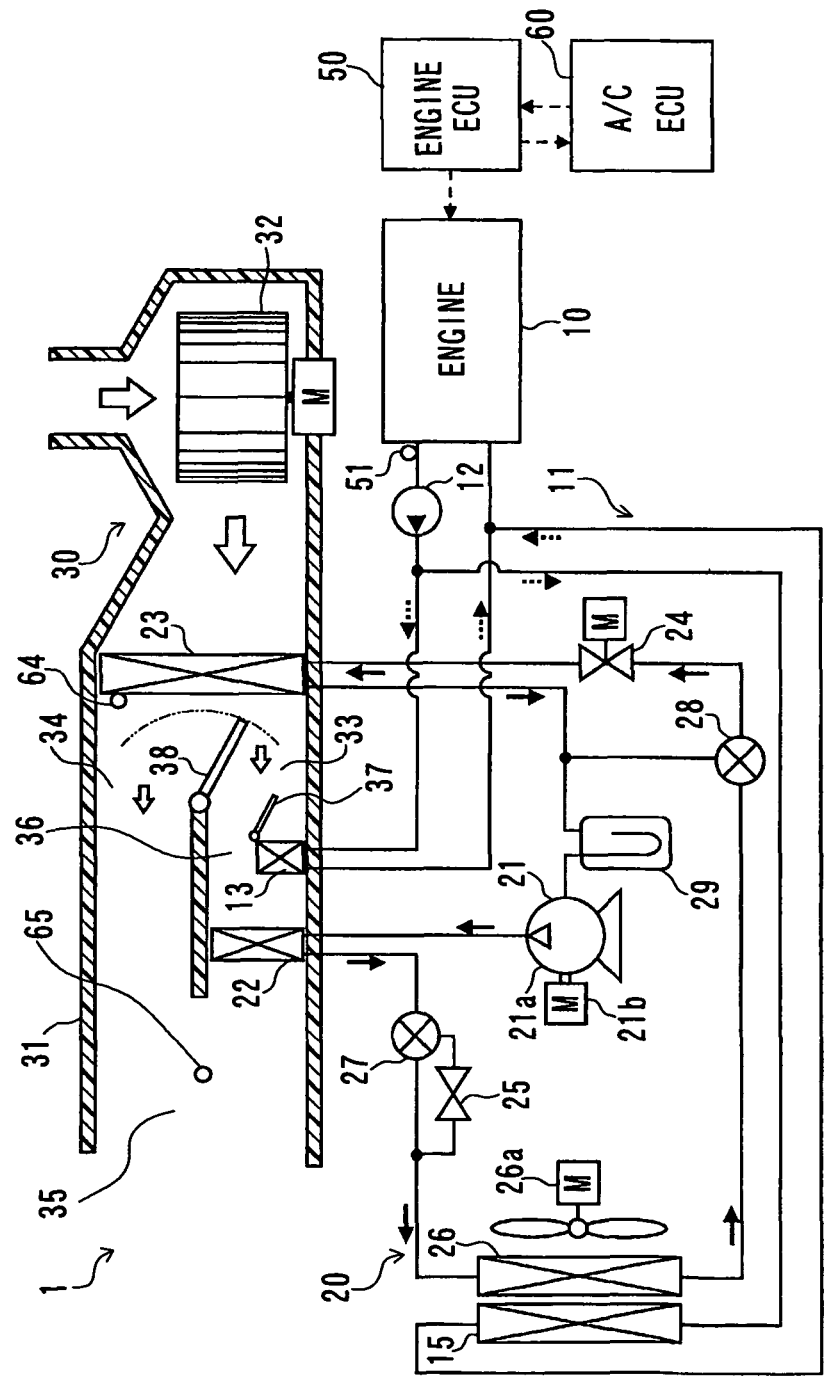
FIG. 11 is a schematic diagram showing an air conditioner for a vehicle according to a third embodiment of the invention.

A third embodiment of the invention will be described with reference to FIGS. 5 and 11.

In the above-described first and second embodiments, the heating capacity changing portion is configured to change the flow amount of engine coolant flowing through the heater core 13. However, in the present embodiment, as shown in FIG. 11, the flow amount of air flowing through the heater core 13 is changed so that the heating capacity of the heater core 13 is changed.

Because the allowable heating capacity Qw_cap is an allowable heat radiation amount of the heater core 13, the allowable heat radiation amount of the heater core 13 is the maximum heat absorbing amount of air in the heater core 13. Thus, by changing the maximum heat absorbing amount of air, the heat radiation amount of the heater core 13, that is, the heating capacity of the heater core 13 can be changed.

In the present embodiment, a heater-core bypass passage 36 is provided in the first air passage 33, so that air bypasses the heater core 13 through the heater-core bypass passage 36 within the first air passage 33. Furthermore, a heater-core bypass door 37 is arranged in the first air passage 33 at an upstream air side of the heater core 13, to change a ratio between a flow amount of air flowing through the heater core 13 and a flow amount of air flowing through the heater-core bypass passage 36.

Furthermore, in the present embodiment, at step S11 of FIG. 5, the flow amount of air flowing through the heater core 13 is determined such that the heating capacity of the heater core 13 is approached to the allowable heating capacity Qw_cap, and the open degree of the heater-core bypass door 37 is determined so that the determined flow amount of air flowing through the heater core 13 can be obtained. Other configurations and control operation of the present embodiment are similar to those of the above-described first embodiment.

As a result, in a vehicle air conditioner 1 of the present embodiment, similarly to the above first embodiment, the heating or the dehumidifying and heating of the vehicle compartment can be suitably performed by suitably using the exhaust heat of the engine 10 while preventing deterioration of the fuel consumption in the vehicle. Furthermore, the heating capacity changing portion can be easily configured by using the heater-core bypass passage 36 and the heater-core bypass door 37, with a simple structure.

Furthermore, it may be possible to combine the heating capacity changing portion of the present embodiment with any one heating capacity changing portion of the first and second embodiments.

Fourth Embodiment

Figure 12:
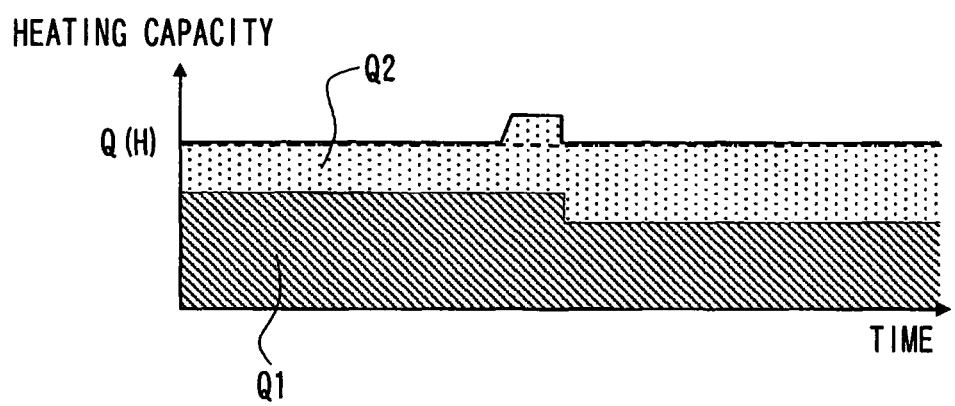
FIG. 12 is a graph showing a variation in a total heating capacity for heating air to be blown into a vehicle compartment, according to a fourth embodiment of the present invention.

A fourth embodiment of the invention will be described with reference to FIGS. 1, 5 and 12.

In the fourth embodiment, control operation of the air conditioning controller 60 shown in FIG. 5 is modified as compared with the first embodiment. Specifically, in the present embodiment, at step S11 of FIG. 5, after the valve open degree of the flow adjustment valve 14 is determined, it is determined whether the valve open degree of the flow adjustment valve 14 determined at the present time is smaller than the valve open degree of the flow adjustment valve 14 determined at the previous time. That is, it is determined whether the heating capacity of the heater core 13 is lowered based on the valve open degrees of the flow adjustment valve 14 determined at the previous time and at the present time.

When the valve open degree of the flow adjustment valve 14 determined at the present time is smaller than the valve open degree of the flow adjustment valve 14 determined at the previous time, it is determined that the heating capacity of the heater core 13 is lowered. In this case, the refrigerant discharge capacity of the compressor 21 is increased by a predetermined amount, while the valve open degree of the flow adjustment valve 14 is maintained at the valve open degree determined at the previous time. When a predetermined time (e.g., 2 to 3 seconds) elapses after the refrigerant discharge capacity of the compressor 21 is increased, the valve open degree of the flow adjustment valve 14 is decreased to the valve open degree determined at the present time.

Other configurations and control operation of the present embodiment are similar to those of the above-described first embodiment. For example, in the fourth embodiment, the other steps except for step S11 in FIG. 5 are similar to those of the first embodiment. According to the fourth embodiment, the discharge capacity control portion (second heating capacity control portion) 60b can increase the heating capacity of the interior condenser 22, before the heating capacity control portion 60a decreases the heating capacity of the heater core 13. Thus, as shown in FIG. 12, a total value (Q1+Q2) of a heating capacity Q1 of the heater core 13 and a heating capacity Q2 of the interior condenser 22 can be made to be not lower than a necessary heating capacity Q(H) that is necessary for the heating or the dehumidifying and heating of the vehicle compartment.

As a result, before the temperature of air to be blown into the vehicle compartment is decreased due to a decrease of the heating capacity of the heater core 13, the air to be blown into the vehicle compartment is heated by the interior condenser 22, thereby preventing the heating feeling of a passenger from being detracted. FIG. 12 is a graph showing a variation of, the total heating capacity (Q1+Q2) of the heater core 13 and the interior condenser 22. In FIG. 12, Q1 is the heating capacity of the heater core 13, and Q2 is the heating capacity of the interior condenser 22. As shown in FIG. 12, before the heating capacity Q1 of the heater core 13 is decreased, the heating capacity Q2 of the interior condenser 22 is increased for a predetermined time, so that the total heating capacity (Q1+Q2) is not lower than the necessary heating capacity Q(H). The control operation of the present embodiment shown in FIG. 12 can be applied to the control of the second or third embodiment.

Fifth Embodiment

Figure 13:
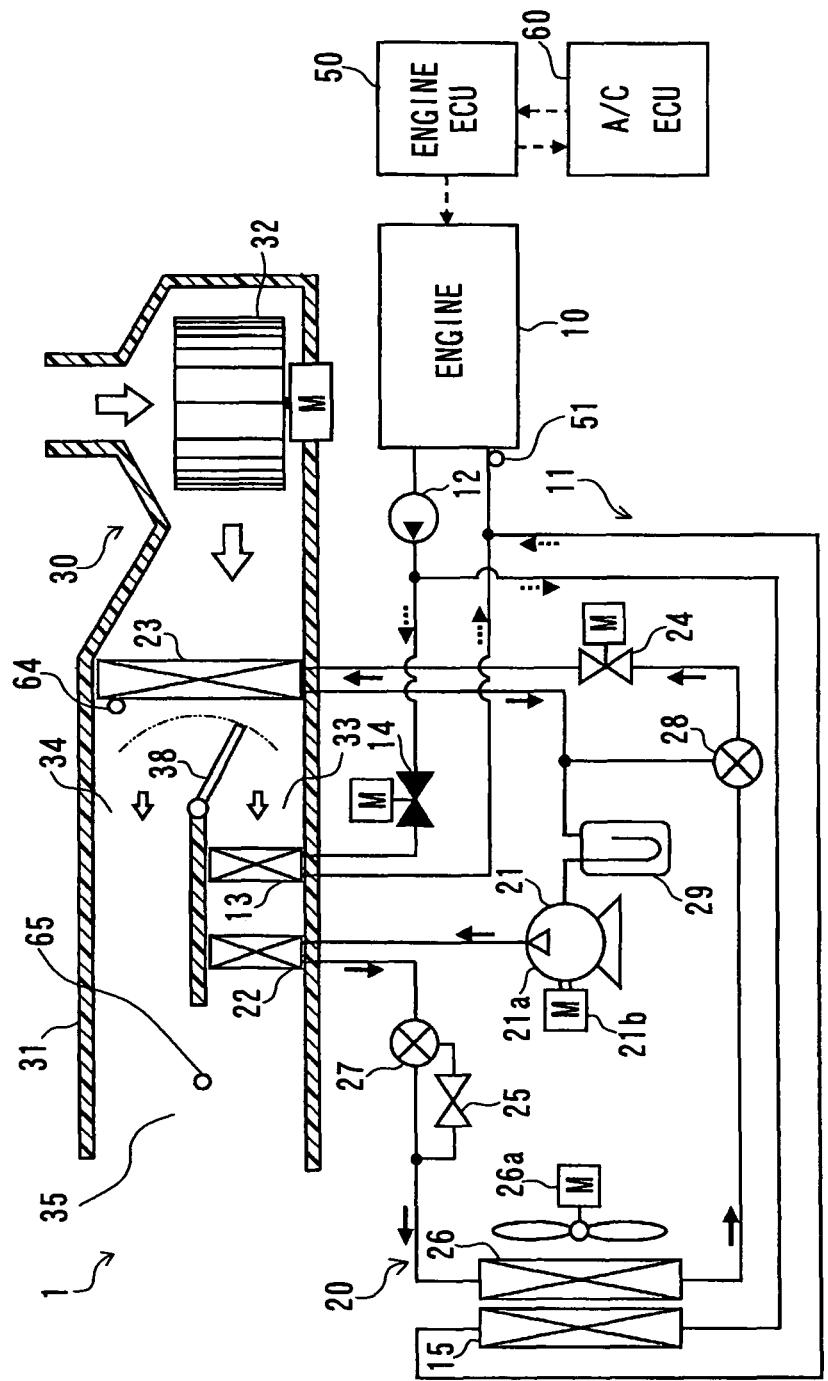
FIG. 13 is a schematic diagram showing an air conditioner for a vehicle according to a fifth embodiment of the invention.
Figure 14:
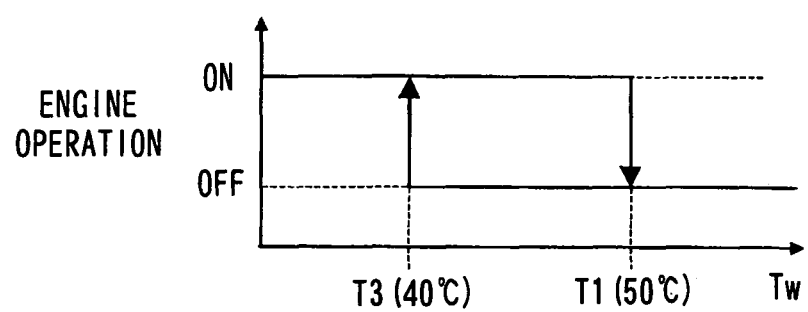
FIG. 14 is a graph showing a control characteristic in a heating control of an engine, according to the fifth embodiment.

A fifth embodiment of the invention will be described with reference to FIGS. 5, 13 and 14.

In the fifth embodiment, the arrangement position of the coolant temperature sensor 51 is changed, so that the temperature detected by the coolant temperature sensor 51 is changed, with respect to the first embodiment. Specifically, in the present embodiment, the coolant temperature sensor 51 is arranged to detect the temperature of the engine coolant immediately before flowing into the engine 10, as shown in FIG. 13.

In the present embodiment, the coolant temperature Tw of the engine coolant detected by the coolant temperature sensor 51 is a temperature having the relation with the temperature of the engine 10 itself. The coolant temperature Tw detected by coolant temperature sensor 51 is lower than an actual temperature of the engine 10 by the heat quantity radiated at the heater core 13. In the engine controller 50 of the present embodiment, the coolant temperature Tw of the engine coolant detected by the coolant temperature sensor 51 is not only used as the temperature of the engine 10 itself, but also used for the heating control of the engine 10.

For example, in the engine heating control of the present embodiment, when the coolant temperature Tw detected by the coolant temperature sensor 51 is lower than a third temperature T3 (e.g., 40° C.) that is lower than the first temperature T1 (e.g., 50° C.), the engine controller 50 performs the heating control of the engine 10 regardless of a vehicle traveling state, until the coolant temperature Tw is increased to the first temperature T1 (e.g., 50° C.).

In the present embodiment, because the temperature of the engine coolant immediately before flowing into the engine 10 is adapted as the coolant temperature Tw, the first temperature T1 can be set at a higher value than that in the first embodiment. Because the first temperature T1 of the present embodiment is set higher than a temperature at which the heating of the engine 10 is actually required, it can effectively restrict a friction generation in the engine 10 or an operation error of a catalyst for purifying exhaust gas.

In the engine heating control of the present embodiment, the coolant temperature Tw of the engine coolant immediately before flowing into the engine 10 is detected by the coolant temperature sensor 51, and is used as the temperature of the engine 10. Furthermore, the operation of the engine 10 is controlled so that the temperature of the engine 10 is approached to the first temperature T1 in a predetermined temperature range equal to or lower than the first temperature T1.

According to the present embodiment, at step S10 in FIG. 5, an allowable heating capacity Qw_cap of the engine coolant in the heater core 13 is determined, such that the temperature of the engine 10 is approached to the first temperature T1 within the predetermined temperature range equal to or lower than the first temperature T1, in a case where the engine coolant flowing out of the heater core 13 and the engine coolant returning to the engine 10 from the radiator 15 are joined to be returned to the engine 10.

Other configurations and control operation of the present embodiment are similar to those of the above-described first embodiment. According to the present embodiment, even when the coolant temperature Tw detected by the coolant temperature sensor 51 is used as the temperature of the engine 10 itself so that the first temperature T1 is set higher than the heating necessary temperature at which the heating of the engine is actually required, the heating or the dehumidifying and heating of the vehicle compartment can be suitably performed as in the first embodiment.

In the present embodiment, the flow amount Gw of the engine coolant flowing into the heater core 13 is controlled, such that the temperature of the engine 10 itself is approached to the first temperature T1 in the predetermined temperature range equal to or lower than the first temperature T1, when the engine coolant is returned to the engine 10 after passing through the heater core 13. Thus, it can prevent the actual temperature of the engine 10 from being lower than the heating necessary temperature at which the heating of the engine 10 is required.

As a result, according to the present embodiment, the heating or the dehumidifying and heating of the vehicle compartment can be suitably performed by using the exhaust heat of the engine 10 while preventing deterioration of the fuel consumption in the vehicle. The control operation of the present embodiment may be suitably applied to any one of first to fourth embodiments. Specifically, in the second to fourth embodiments, the coolant temperature sensor 51 may be arranged to detect the temperature of the engine coolant immediately before flowing into the engine 10, similarly to the fifth embodiment.

Sixth Embodiment

Figure 15:
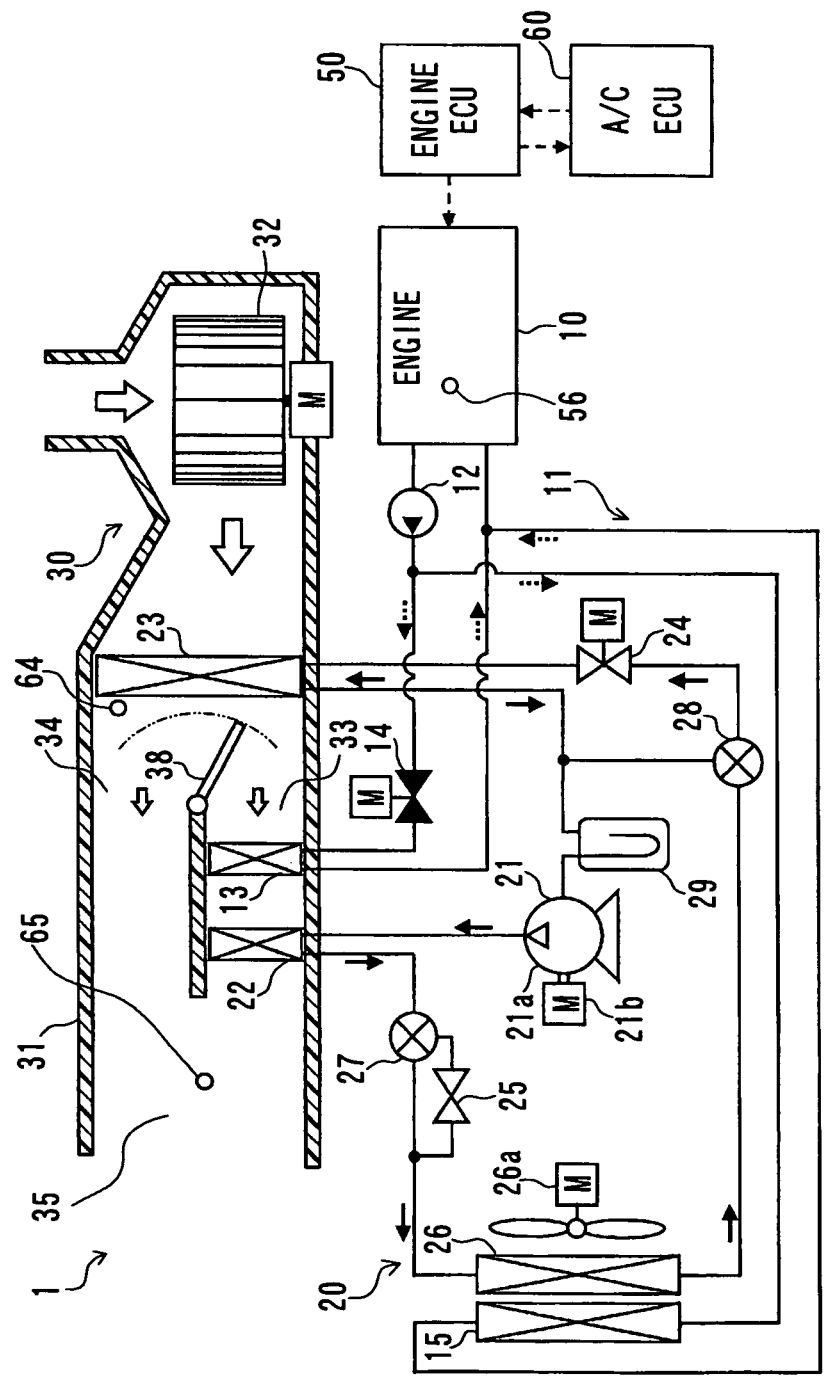
FIG. 15 is a schematic diagram showing an air conditioner for a vehicle according to a sixth embodiment of the invention.

A sixth embodiment of the invention will be described with reference to FIG. 15.

In the sixth embodiment, the coolant temperature sensor 51 is omitted, and an engine temperature sensor 56 is located to detect a surface temperature of the engine 10, with respect to the first embodiment. In the present embodiment, the detection value, of the engine temperature sensor 56 is used instead of the coolant temperature Tw of the first embodiment, and the same control as in the first embodiment is performed.

Other configurations and control operation of the present embodiment are similar to those of the above-described first embodiment. As in the present embodiment, even when the surface temperature of the engine 10 detected by the engine temperature sensor 56 is used as the temperature of the engine 10 itself, the effects similar to the first embodiment can be obtained. The engine temperature sensor 56 of the present embodiment may be used for the second to fifth embodiments.

Other Embodiment

The present invention is not limited to the above-described embodiments, and the following various deformations are possible.

(1) In the above described embodiments, the air conditioner 1 is typically used for a hybrid vehicle, and the engine 10 is typically used as a vehicle equipment operated in accordance with a vehicle traveling state. However, the vehicle equipment is not limited to the engine 10. For example, when the air conditioner 1 is used for a fuel cell vehicle, a fuel cell for supplying electrical power to a motor for a vehicle traveling may be used as the vehicle equipment, and a cell coolant for cooling the fuel cell may be supplied to the heater core 13 as a thermal fluid.

In this case, the heat generation amount of the fuel cell is changed in accordance with a drive load of the vehicle, but it is necessary to keep the temperature of the fuel cell itself to a certain temperature in order to improve the electricity generating efficiency. Thus, it may be insufficient to suitably perform a heating of the vehicle compartment by using the cell coolant heated by exhaust heat of the fuel cell. Furthermore, when the temperature of the fuel cell itself becomes lower than a predetermined temperature due to the cell coolant flowing into the fuel cell from the heater core 13, the power generation efficiency is decreased thereby deteriorating the fuel consumption performance.

Thus, when the air conditioner 1 of the invention is applied to a fuel cell vehicle, it is possible to effectively perform the heating or the dehumidifying and heating of the vehicle compartment by suitably using the exhaust heat of the fuel cell, while preventing deterioration of the fuel consumption in the vehicle.

(2) In the above described embodiments, the interior condenser 22 of the refrigerant cycle 20 is used as the auxiliary heater (second heater), and the refrigerant discharge capacity of the compressor 21 is changed by using the discharge capacity control portion 60b, so that the heating capacity of the interior condenser 22 is controlled. However, the auxiliary heater is not limited to the interior condenser 22.

For example, an electrical heater, which generates heat when electrical power is supplied thereto, may be used as the auxiliary heater. In this case, the heating capacity of the electrical heater may be controlled by electrical power output from an auxiliary heating-capacity control portion. Furthermore, as an auxiliary heater, a device may be adapted, which provides a heating capacity by using an energy supplied from a vehicle equipment that is different from the vehicle equipment for supplying heat source to the main heater (heater core 13).

(3) In the above described embodiments, the allowable heating capacity Qw_cap is determined based on the coolant temperature Tw by using a control map stored in the air conditioning controller 60. However, the allowable heating capacity Qw_cap may be determined by a way different from it. For example, the allowable heating capacity Qw_cap may be determined based on the coolant temperature Tw, a fuel consumption amount Qfuel and an exhaust heat efficiency Heh, by using a control map stored in the air conditioning controller 60.

Furthermore, the allowable heating capacity Qw_cap may be defined by subtracting a radiation heat quantity radiated from the surface of the engine 10, from a total of the heat quantity generated by combustion of the fuel in the engine 10 and the heat quantity of the engine 10 itself. For example, the allowable heating capacity Qw_cap may be determined by the following formula F2, based on the coolant temperature Tw, a heat capacity Kmass of a device configuring the coolant circuit, the vehicle speed Vv, a heat radiation coefficient Krad of the engine 10 itself, an outside air temperature Tam, the first temperature T1, the fuel consumption amount Qfuel and the exhaust heat efficiency Heh.

$$Qw\_cap = Qfuel \times Heh + Q(Tw, T1, Kmass) - Q(Vv, Krad, Tam) \quad (F2)$$

Here, Qfuel is the energy of the consumption fuel, and corresponds to a working amount to be output from the engine 10 by the fuel consumption. Generally, the energy of 1 liter gasoline is about 3 MJ.

The exhaust heat efficiency Heh is a ratio of a total value of the working amount actually output from the engine 10 and a heat quantity (working amount) except for the exhaust heat, to a working amount capable of outputting from the engine 10 by the fuel consumption. Generally, the working amount actually output from the engine 10 is about 30% with respect to the working amount capable of outputting from the engine 10 by the fuel consumption. The heat quantity of the exhaust heat is about 20%, and the heat quantity except for the exhaust heat is about 50%.

In the formula F2, the item Q(Tw, T1, Kmass) indicates the heat quantity (heat mass part) of the engine coolant system itself. When the temperature of the engine coolant system is equal to or higher than the first temperature T1, the heat of the engine coolant system can be used for heating air to be blown into the vehicle compartment.

(4) In the above-described embodiments, the coolant pump 12 may be used as the heating capacity changing portion. In this case, the operation of the coolant pump 12 can be controlled such that the flow amount of the coolant pump 12 is increased as the heating capacity of the heater core 13 increases. Furthermore, the air conditioning controller 60 is configured to output a signal for changing a rotation speed of the coolant pump 12, to the engine controller 50.

(5) In the above-described embodiments, the operation mode is determined based on the operation signal of the operation mode selecting switch of the operation panel, at step S3 of FIG. 5. However, the determination of the operation mode is not limited to it.

The operation mode may be set based on sensor signals and switch signals. For example, when the set temperature Tset set by the temperature setting switch is lower than the inside air temperature Tr of the vehicle compartment detected by the inside air sensor 61, the cooling mode may be set. When the set temperature Tset is higher than the inside air temperature Tr of the vehicle compartment, the heating mode may be set. Furthermore, when the set temperature Tset is higher than the inside air temperature of the vehicle compartment, and when the outside air temperature Tam detected by the outside air sensor 62 is lower than a predetermined temperature, the dehumidifying and heating mode may be set.

(6) In the above-described embodiments, at step S10 of FIG. 5, the temperature Thco of air flowing out of the heater core 13 is calculated by using the refrigerant evaporation temperature Te as a reference temperature of air flowing into the heater core 13. However, in the heating mode, the refrigerant is not evaporated in the interior evaporator 23. Thus, in the heating mode, the temperature Thco of air flowing out of the heater core 13 may be calculated by using the outside air temperature Tam, instead of the refrigerant evaporation temperature Te.

(7) In the above-described embodiments, the air conditioner 1 of the invention is used for a hybrid vehicle of a parallel type, in which the vehicle is capable of traveling by direct driving force from both of the engine 10 and the electrical motor for traveling.

However, the air conditioner 1 of the invention may be applied to a hybrid vehicle of a serial type, in which an electrical power, generated from a generator driven by a vehicle engine, is stored in a battery, and a vehicle drive force is obtained from an electrical motor operated by the electrical power supplied from the battery.

(8) In the above-described first to fifth embodiments, the coolant temperature Tw of the engine coolant is used as the temperature of the engine 10. In the above-described sixth embodiment, the temperature of the outer surface of the engine 10 is used as the temperature of the engine 10. Furthermore, in the other embodiment, a physical amount having a relation with the temperature of the engine 10 itself may be used as the temperature of the engine 10.

Generally, the temperature of the engine 10 itself has a temperature distribution. Thus, when a temperature on a high temperature side in the temperature distribution is used as the temperature of the engine 10 itself, the heating control of the engine 10 may be performed to be approached to the first temperature T1 in a predetermined temperature range equal to or higher than the first temperature T1, as in the above-described first embodiment. In contrast, when a temperature on a low temperature side in the temperature distribution is used as the temperature of the engine 10 itself, the heating control of the engine 10 may be performed to be approached to the first temperature T1 in a predetermined temperature range equal to or lower than the first temperature T1, as in the above-described fifth embodiment.

Such changes and modifications are to be understood as being within the scope of the present invention as defined by the appended claims.

What is claimed is:

1. An air conditioner for a hybrid vehicle with an engine mounted to the hybrid vehicle, the air conditioner comprising:
   a first heater disposed in a thermal fluid circulation circuit in which a thermal fluid heated by exhaust heat of the engine circulates, and configured to heat air to be blown into a vehicle compartment by using the thermal fluid as a heat source;
   a second heater disposed downstream of the first heater in a flow direction of the air to be blown into the vehicle compartment, and adapted as an auxiliary heater to further heat the air heated by the first heater;
   a first heating capacity control portion controlling a heating capacity of the first heater; and
   a second heating capacity control portion controlling a heating capacity of the second heater, wherein
   the first heating capacity control portion controls the heating capacity of the first heater such that a temperature of the engine approaches a predetermined temperature regardless of an operation state of the engine when the thermal fluid after passing through the first heater returns to the engine,
   the second heating capacity control portion controls the heating capacity of the second heater such that temperature of the air to be blown into the vehicle compartment becomes a desired temperature,
   the thermal fluid circulation circuit is provided with a radiator radiating heat of the thermal fluid, and a thermostat valve operated at an operating temperature to cause the thermal fluid to pass through the radiator or to bypass the radiator,
   the predetermined temperature is lower than the operating temperature of the thermostat valve,
   the first heater is disposed in the thermal fluid circulation circuit to heat air by performing heat exchange between the thermal fluid and air, and
   the second heater is a refrigerant condenser of a refrigerant cycle in which refrigerant discharged from a compressor flows into the second heater to heat the air passing through the second heater.

2. The air conditioner according to claim 1, further comprising
   a heating capacity changing portion configured to change the heating capacity of the first heater, wherein
   the first heating capacity control portion controls operation of the heating capacity changing portion, so as to control the heating capacity of the first heater.

3. The air conditioner according to claim 2, wherein
   the first heater is a heating heat exchanger configured to perform heat exchange between the thermal fluid flowing therein and air passing therethrough, and
   the heating capacity changing portion changes a flow amount of the thermal fluid flowing through the heating heat exchanger, so as to change the heating capacity of the first heater.

4. The air conditioner according to claim 3, wherein the heating capacity changing portion is a flow adjustment valve that adjusts the flow amount of the thermal fluid flowing through the heating heat exchanger.

5. The air conditioner according to claim 3, wherein the heating capacity changing portion is configured by a bypass passage through which the thermal fluid flows while bypassing the heating heat exchanger, and an adjustment valve adjusting an open degree of the bypass passage.

6. The air conditioner according to claim 3, wherein the first heating capacity control portion increases the flow amount of the thermal fluid flowing through the heating heat exchanger in accordance with an increase of the temperature of the thermal fluid before being heat exchanged with the air in the heating heat exchanger.

7. The air conditioner according to claim 2, wherein
   the first heater is a heating heat exchanger configured to perform heat exchange between the thermal fluid flowing therein and air passing therethrough, and
   the heating capacity changing portion changes a flow amount of air passing through the heating heat exchanger, so as to change the heating capacity of the first heater.

8. The air conditioner according to claim 7, wherein the heating capacity changing portion changes a ratio between the flow amount of air passing through the heating heat exchanger and a flow amount of air bypassing the heating heat exchanger, so as to change the flow amount of air passing through the heating heat exchanger.

9. The air conditioner according to claim 1, wherein the thermal fluid is a coolant for cooling the engine mounted to the vehicle.

10. The air conditioner according to claim 1, wherein the predetermined temperature is set to be equal to or higher than a necessary temperature required for a heating control of the engine mounted to the vehicle.

11. The air conditioner according to claim 1, wherein
   when a vehicle speed is lower than a predetermined speed, the first heating capacity control portion controls the heating capacity of the first heater to increase the temperature of the engine, as compared with a case where the vehicle speed is not lower than the predetermined speed.

12. The air conditioner according to claim 1, wherein
   the second heater is a refrigerant radiator in which a refrigerant discharged from the compressor of the refrigerant cycle radiates heat to air, and
   the second heating capacity control portion controls a discharge capacity of the compressor, so as to control the heating capacity of the refrigerant radiator.

13. The air conditioner according to claim 12, wherein the compressor is an electrical compressor that is operated when being supplied with electrical power.

14. The air conditioner according to claim 1, wherein the second heating capacity control portion increases the heating capacity of the second heater before the first heating capacity control portion reduces the heating capacity of the first heater.

15. The air conditioner according to claim 1, wherein the engine mounted to the vehicle is an internal combustion engine that outputs a drive force for traveling the vehicle.

16. The air conditioner according to claim 1, wherein the first heating capacity control portion controls the heating capacity of the first heater such that the temperature of the engine approaches the predetermined temperature within a temperature range equal to or higher than the predetermined temperature.

17. The air conditioner according to claim 1, wherein the first heating capacity control portion controls the heating capacity of the first heater such that the temperature of the engine approaches the predetermined temperature within a temperature range equal to or lower than the predetermined temperature.

18. The air conditioner according to claim 1, further comprising:
an interior heat exchanger that is an evaporator of the refrigerant cycle, and is disposed upstream of the first heater in the flow direction of the air to cool the air; and
a cool air bypass passage through which air after passing through the interior heat exchanger flows while bypassing both the first heater and the second heater.

19. The air conditioner according to claim 1, wherein the second heater always further heats all the air heated by the first heater when the second heater heats the air heated by the first heater.

20. An air conditioner for a hybrid vehicle with an engine mounted to the hybrid vehicle, the air conditioner comprising:
a first heater disposed in a thermal fluid circulation circuit in which a thermal fluid heated by exhaust heat of the engine circulates, and configured to heat air to be blown into a vehicle compartment by using the thermal fluid as a heat source;
a second heater disposed downstream of the first heater in a flow direction of the air to be blown into the vehicle compartment, and adapted as an auxiliary heater to further heat the air heated by the first heater;
a first heating capacity control portion controlling a heating capacity of the first heater; and
a second heating capacity control portion controlling a heating capacity of the second heater, wherein
the first heating capacity control portion controls the heating capacity of the first heater such that a temperature of the engine becomes equal to or higher than a predetermined temperature regardless of an operation state of the engine when the thermal fluid after passing through the first heater returns to the engine,
the second heating capacity control portion controls the heating capacity of the second heater such that temperature of the air to be blown into the vehicle compartment becomes a desired temperature,
the thermal fluid circulation circuit is provided with a radiator radiating heat of the thermal fluid, and a thermostat valve operated at an operating temperature to cause the thermal fluid to pass through the radiator or to bypass the radiator,
the predetermined temperature is lower than the operating temperature of the thermostat valve,
the first heater is disposed in the thermal fluid circulation circuit to heat air by performing heat exchange between the thermal fluid and air, and
the second heater is a refrigerant condenser of a refrigerant cycle in which refrigerant discharged from a compressor flows into the second heater to heat the air passing through the second heater.

21. The air conditioner according to claim 20, wherein a temperature of the thermal fluid is used as the temperature of the engine.

22. The air conditioner according to claim 20, wherein the predetermined temperature is set to be equal to or higher than a necessary temperature required for a heating control of the engine mounted to the vehicle.

23. The air conditioner according to claim 20, wherein
when a vehicle speed is lower than a predetermined speed, the first heating capacity control portion controls the heating capacity of the first heater to increase the temperature of the engine, as compared with a case where the vehicle speed is not lower than the predetermined speed.

24. The air conditioner according to claim 20, wherein
the second heating capacity control portion increases the heating capacity of the second heater before the first heating capacity control portion reduces the heating capacity of the first heater.

25. The air conditioner according to claim 20, wherein the second heater always further heats all the air heated by the first heater when the second heater heats the air heated by the first heater.

* * * * *